US012802894B2

(12) United States Patent
Furukawa et al.

(10) Patent No.: US 12,802,894 B2
(45) Date of Patent: Nov. 17, 2026

(54) CAPACITOR ARRAY

(71) Applicant: Murata Manufacturing Co., Ltd., Nagaokakyo (JP)

(72) Inventors: Takeshi Furukawa, Nagaokakyo (JP); Koshi Himeda, Nagaokakyo (JP); Shuhei Yamada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 148 days.

(21) Appl. No.: 19/007,888

(22) Filed: Jan. 2, 2025

(65) Prior Publication Data

US 2025/0166931 A1 May 22, 2025

Related U.S. Application Data

(63) Continuation of application No. PCT/JP2024/003670, filed on Feb. 5, 2024.

(30) Foreign Application Priority Data

Feb. 28, 2023 (JP) ................................ 2023-029856

(51) Int. Cl.
*H01G 9/26* (2006.01)
*H01G 9/15* (2006.01)

(52) U.S. Cl.
CPC ................ *H01G 9/26* (2013.01); *H01G 9/15* (2013.01)

(58) Field of Classification Search
CPC .................................. H01G 9/26; H01G 9/15
See application file for complete search history.

(56) References Cited

U.S. PATENT DOCUMENTS

2006/0018082 A1* 1/2006 Yamagata ................ H01G 5/38 361/321.2
2006/0092595 A1* 5/2006 Hwa Lee ............... H01G 2/065 361/306.3
2020/0312576 A1 10/2020 Furukawa
(Continued)

FOREIGN PATENT DOCUMENTS

JP 2006-165152 A 6/2006
JP 2007-173439 A 7/2007
(Continued)

OTHER PUBLICATIONS

International Search Report received for PCT Patent Application No. PCT/JP2024/003670, mailed on Apr. 23, 2024, 2 pages (English Translation only).

*Primary Examiner* — Michael P McFadden
(74) *Attorney, Agent, or Firm* — ArentFox Schiff LLP

(57) ABSTRACT

A capacitor array that includes: a plurality of capacitor units, where an actual overall capacitance corresponding to an electrostatic capacity for a total area of the capacitor units in an electrostatic capacity of an entirety of the capacitor array is larger than virtual overall capacitance obtained by multiplying a total number n of virtual units corresponding to an inter-center distance p between a first through-conductor and a second through-conductor when the electrostatic capacity $C_{unit}$ per unit reaches a maximum value by the maximum value of the electrostatic capacity $C_{unit}$ per unit.

20 Claims, 11 Drawing Sheets

(56) References Cited

U.S. PATENT DOCUMENTS

| | | | | |
|---|---|---|---|---|
| 2023/0120573 | A1* | 4/2023 | Kusuyama | H01G 9/26 361/500 |
| 2024/0186071 | A1* | 6/2024 | Takahashi | H01G 9/012 |
| 2024/0186072 | A1* | 6/2024 | Yoshikawa | H01G 9/008 |
| 2024/0334591 | A1* | 10/2024 | Furukawa | H05K 1/0231 |

FOREIGN PATENT DOCUMENTS

| | | | |
|---|---|---|---|
| JP | 2009-004417 | A | 1/2009 |
| JP | 2020-167361 | A | 10/2020 |

* cited by examiner

CAPACITOR ARRAY

CROSS REFERENCE TO RELATED APPLICATIONS

The present application is a continuation of International application No. PCT/JP2024/003670, filed Feb. 5, 2024, which claims priority to Japanese Patent Application No. 2023-029856, filed Feb. 28, 2023, the entire contents of each of which are incorporated herein by reference.

TECHNICAL FIELD

The present disclosure relates to a capacitor array.

BACKGROUND ART

Patent Document 1 discloses a capacitor array including a plurality of solid electrolytic capacitor elements obtained by dividing one solid electrolytic capacitor sheet, a sheet-like first sealing layer, and a sheet-like second sealing layer. The solid electrolytic capacitor sheet includes a positive electrode plate consisting of valve action metal, a porous layer provided on at least one main surface of the positive electrode plate, a dielectric layer provided on a surface of the porous layer, and a negative electrode layer including a solid electrolyte layer provided on a surface of the dielectric layer, and includes a first main surface and a second main surface opposite to each other in a thickness direction. A side of the first main surface of each of the plurality of solid electrolytic capacitor elements is disposed on the first sealing layer. The second sealing layer is disposed to cover the plurality of solid electrolytic capacitor elements on the first sealing layer from a side of the second main surface. A space between the solid electrolytic capacitor elements is divided by a slit-shaped sheet removing portions.

Patent Document 1: Japanese Unexamined Patent Application Publication No. 2020-167361

SUMMARY OF THE DISCLOSURE

Patent Document 1 describes that it is preferable that a through-electrode that penetrates the first sealing layer or the second sealing layer in the thickness direction is provided, and the positive electrode plate or the negative electrode layer are connected with an outer electrode via the through-electrode.

For example, FIG. 22 and the like of Patent Document 1 describe a structure in which a capacitor unit is composed of a capacitor effective part present around a pair of through-electrodes (hereinafter, referred to as through-conductors) and such capacitor units are repeatedly and collectively arranged.

In a case where a large current is caused to flow through a capacitor array as described in Patent Document 1, it is necessary to increase a conductor amount of through-conductors by a method of increasing diameters of the through-conductors, increasing the number of the through-conductors, and the like. However, in a case where the conductor amount of the through-conductors increases with respect to an occupied area of the capacitor array, an electrostatic capacity of the capacitor unit decreases accordingly, and thus an electrostatic capacity of the entire capacitor array decreases.

The above-described problem is not limited to a solid electrolytic capacitor element, but is a problem common to a capacitor array including a plurality of capacitor elements.

The present disclosure has been made in order to solve the above-described problem, and an object of the present disclosure is to provide a capacitor array in which an overall electrostatic capacity is large with respect to a conductor amount of a through-conductor required according to an amount of current.

A capacitor array according to the present disclosure includes: a plurality of capacitor units arranged in a plane direction. Each of the capacitor units includes a capacitor element, a first through-conductor, and a second through-conductor. The capacitor element includes a first electrode layer and a second electrode layer, and a dielectric layer. The first electrode layer and the second electrode layer face each other with the dielectric layer in between in a thickness direction perpendicular to the plane direction. The first through-conductor is on at least an inner wall surface of a first through-hole that penetrates the capacitor element in the thickness direction and is electrically connected to the first electrode layer. The second through-conductor is on at least an inner wall surface of a second through-hole that penetrates the capacitor element in the thickness direction and is electrically connected to the second electrode layer. An area of the capacitor unit, a diameter of the first through-hole, an area of the first through-conductor in the first through-hole, a diameter of the second through-hole, an area of the second through-conductor in the second through-hole, and an inter-center distance between the first through-conductor and the second through-conductor are equivalent between the capacitor units in a plan view of the capacitor array in the thickness direction. When the area of the first through-conductor in the first through-hole is denoted by $S_{TH1}$ and the area of the second through-conductor in the second through-hole is denoted by $S_{TH2}$ in the capacitor unit, and a total number of the capacitor units included in the capacitor array is denoted by N, in a case where a correlation of an electrostatic capacity $C_{unit}$ per unit with respect to an inter-center distance p between the first through-conductor and the second through-conductor is obtained from virtual units satisfying all of Conditions 1 to 4: Condition 1: a total number of the virtual units included in the capacitor array is denoted by n, Condition 2: an area of a virtual unit, a diameter of a first through-hole, an area of a first through-conductor in the first through-hole, a diameter of a second through-hole, an area of a second through-conductor in the second through-hole, and an inter-center distance between the first through-conductor and the second through-conductor are equivalent between the virtual units in the plan view of the capacitor array in the thickness direction, Condition 3: the area of the first through-conductor in the first through-hole is denoted by $S_{th1}$ and the area of the second through-conductor in the second through-hole is denoted by $S_{th2}$ in the virtual unit, and Condition 4: a value of $(S_{th1}+S_{th2})\times n$ is equal to a value of $(S_{TH1}+S_{TH2})\times N$, actual overall capacitance corresponding to an electrostatic capacity for a total area of the capacitor units in an electrostatic capacity of an entirety of the capacitor array is larger than virtual overall capacitance obtained by multiplying the total number n of the virtual units corresponding to the inter-center distance p when the electrostatic capacity $C_{unit}$ per unit reaches a maximum value by the maximum value of the electrostatic capacity $C_{unit}$ per unit.

According to the present disclosure, it is possible to provide a capacitor array in which an overall electrostatic capacity is large with respect to a conductor amount of a through-conductor required according to an amount of current.

DESCRIPTION OF THE PREFERRED EMBODIMENTS

Figure 1:
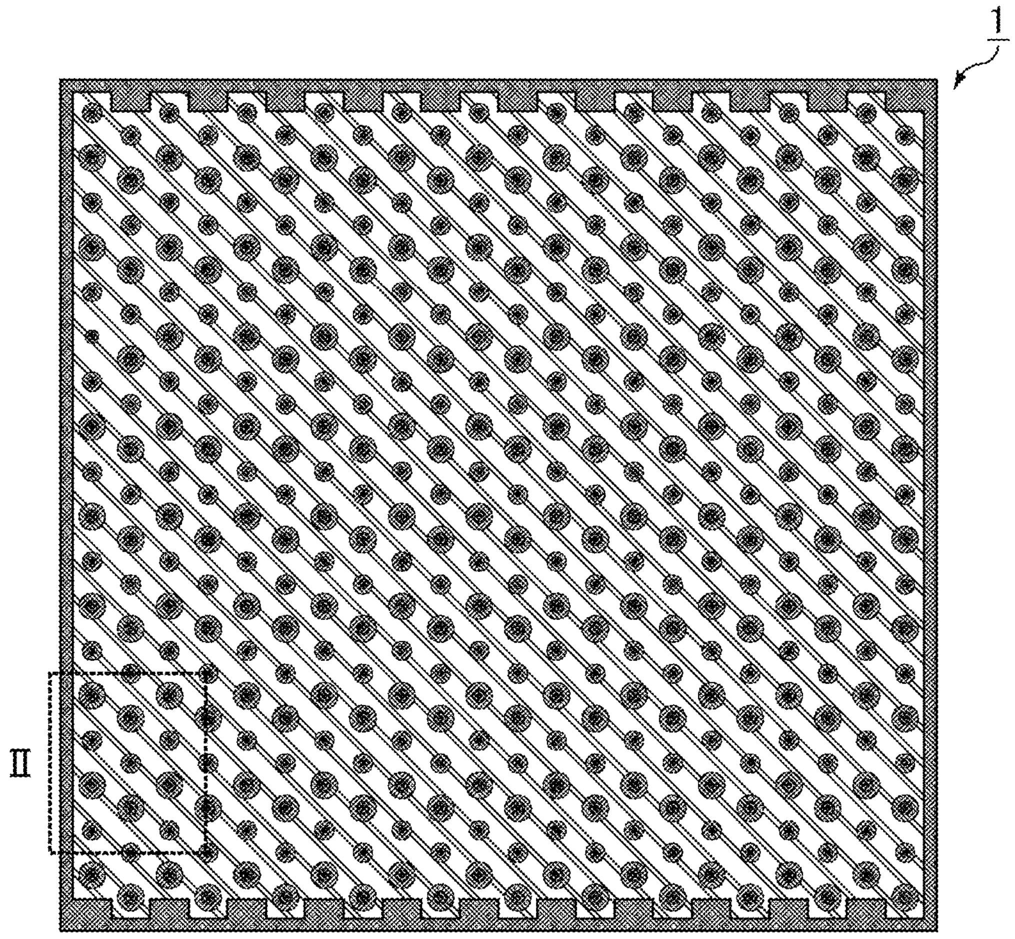
FIG. 1 is a plan view schematically showing an example of a capacitor array according to the present disclosure.

Hereinafter, a capacitor array according to the present disclosure will be described. The present disclosure is not limited to the following configurations, and may be modified as appropriate without changing the gist of the present disclosure. In addition, the present disclosure also includes a combination of a plurality of individual preferred configurations described below.

In the present specification, a term indicating a relationship between elements (for example, "perpendicular", "parallel", "orthogonal", and the like) and a term indicating a shape of an element are not expressions that only represent a strict meaning, but are expressions that mean to include a substantially equivalent range, for example, a difference of about several percent.

The drawings shown below are schematic views, and dimensions, aspect ratio scales, and the like thereof may differ from an actual product. In the drawings, the same or corresponding parts are denoted by the same reference signs. Further, in each drawing, the same elements are denoted by the same reference signs, and the repetitive descriptions will be omitted.

Figure 2:
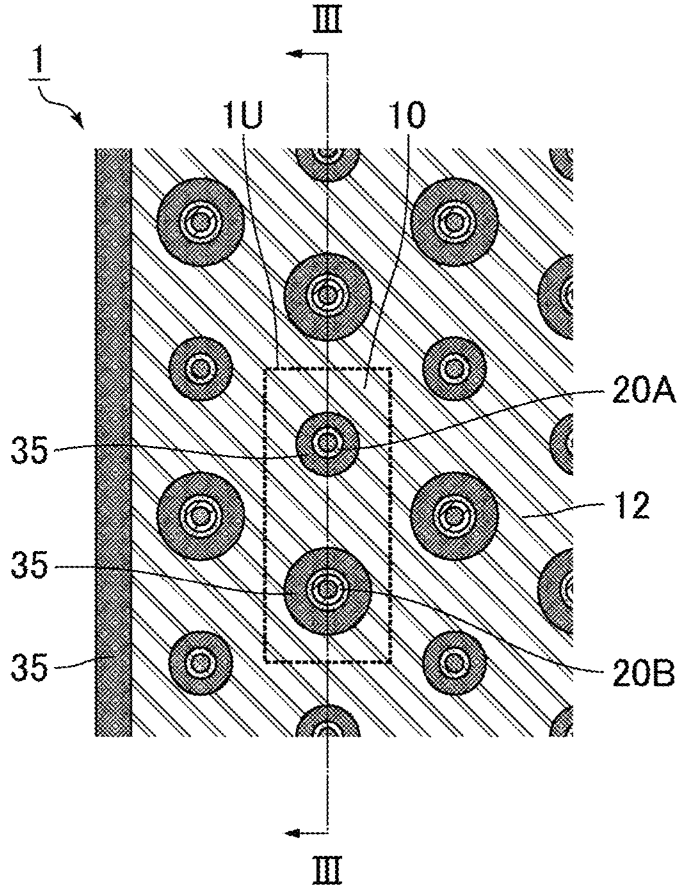
FIG. 2 is an enlarged plan view of a portion indicated by II in the capacitor array shown in FIG. 1.

FIG. 1 is a plan view schematically showing an example of the capacitor array according to the present disclosure. FIG. 2 is an enlarged plan view showing a portion indicated by II in the capacitor array shown in FIG. 1.

A capacitor array 1 shown in FIG. 1 includes a plurality of capacitor units 1U (refer to FIG. 2) arranged in a plane direction.

The number of the capacitor units 1U included in the capacitor array 1 is not particularly limited as long as it is two or more.

As shown in FIGS. 1 and 2, each of the capacitor units 1U includes a capacitor element 10, a first through-conductor 20A, and a second through-conductor 20B.

It is preferable that a configuration of the capacitor element 10 is the same between the capacitor units 1U.

The capacitor elements 10 adjacent to each other in the capacitor units 1U may be divided or need not be divided by a through-groove. In a case where the capacitor elements 10 adjacent to each other in the capacitor units 1U are divided by the through-groove, the capacitor elements 10 adjacent to each other need only be physically divided. Therefore, the capacitor elements 10 adjacent to each other may be electrically divided or may be electrically connected. For example, a set of the capacitor elements 10 that are electrically divided and a set of the capacitor elements 10 that are electrically connected may be mixed.

Figure 3:
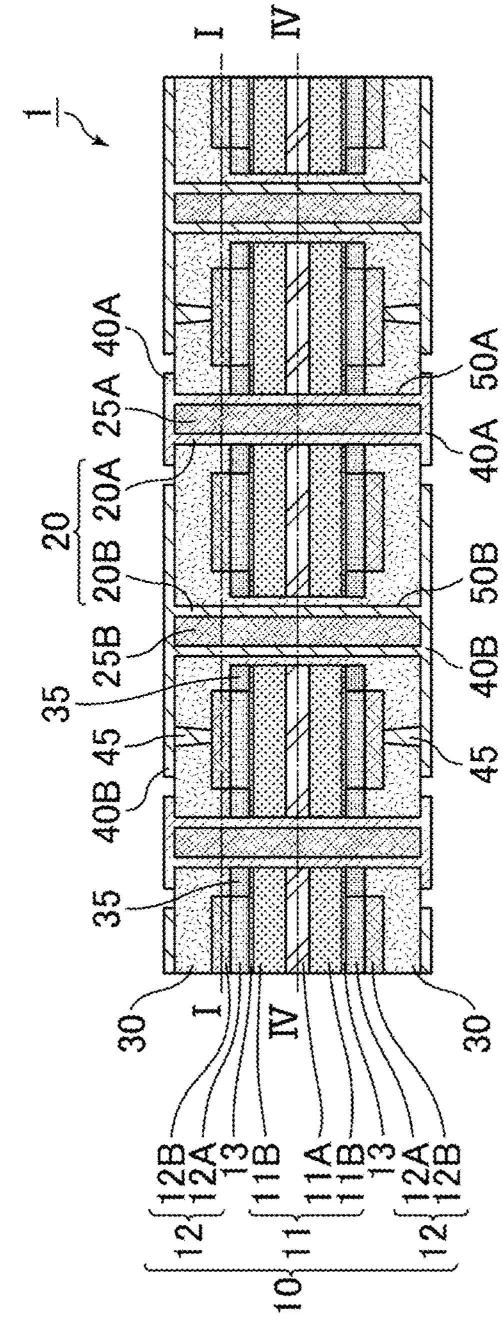
FIG. 3 is an example of a cross-sectional view of the capacitor array shown in FIG. 2 taken along a line III-III.

FIG. 3 is an example of a cross-sectional view of the capacitor array shown in FIG. 2 taken along a line III-III. FIG. 1 is an example of a plan view of the capacitor array shown in FIG. 3 taken along a line I-I.

In the example shown in FIG. 3, the capacitor array 1 further includes a sealing layer 30, a first conductor wiring layer 40A, and a second conductor wiring layer 40B, in addition to the capacitor unit 1U (refer to FIG. 2) including the capacitor element 10, the first through-conductor 20A, and the second through-conductor 20B.

The capacitor element 10 includes a first electrode layer, a second electrode layer, and a dielectric layer. The first electrode layer and the second electrode layer face each other with the dielectric layer in between in a thickness direction perpendicular to the plane direction.

In the example shown in FIG. 3, the capacitor element 10 includes a positive electrode plate 11, a negative electrode layer 12, and a dielectric layer 13. The positive electrode plate 11 and the negative electrode layer 12 face each other with the dielectric layer 13 in between in the thickness direction (in FIG. 3, an up-down direction) perpendicular to the plane direction (in FIG. 3, a left-right direction). That is, the positive electrode plate 11 corresponds to the first electrode layer, and the negative electrode layer 12 corresponds to the second electrode layer. In this way, the capacitor element 10 constitutes an electrolytic capacitor.

The positive electrode plate 11 includes, for example, a core portion 11A consisting of metal and a porous portion 11B provided on at least one main surface of the core portion 11A. In the example shown in FIG. 3, the porous portion 11B is provided on both main surfaces of the core portion 11A, but the porous portion 11B may be provided only on one main surface of the core portion 11A. The dielectric layer 13 is provided on a surface of the porous portion 11B, and the negative electrode layer 12 is provided on a surface of the dielectric layer 13.

The negative electrode layer 12 includes, for example, a solid electrolyte layer 12A provided on the surface of the dielectric layer 13. It is preferable that the negative electrode layer 12 further includes a conductor layer 12B provided on a surface of the solid electrolyte layer 12A. In a case where the negative electrode layer 12 includes the solid electrolyte layer 12A, the capacitor element 10 constitutes a solid electrolytic capacitor.

As shown in FIG. 3, the first through-conductor 20A is provided on at least an inner wall surface of a first through-hole 50A that penetrates the capacitor element 10 in the thickness direction. That is, the first through-conductor 20A may be provided only on the inner wall surface of the first through-hole 50A, or may be provided in an entire inside of the first through-hole 50A. In a case where the first through-conductor 20A is provided only on the inner wall surface of the first through-hole 50A, a space surrounded by the first through-conductor 20A in the first through-hole 50A may be filled with a material containing a resin. That is, a first resin filling portion 25A may be provided in an inner side portion of the first through-conductor 20A. In the example shown in FIG. 3, the first through-conductor 20A is provided on the inner wall surface of the first through-hole 50A that penetrates the sealing layer 30 and the capacitor element 10 in the thickness direction.

As shown in FIGS. 1 and 2, it is preferable that the first through-conductor 20A is present in the negative electrode layer 12 in plan view of the positive electrode plate 11 in the thickness direction.

As shown in FIG. 3, the first through-conductor 20A is electrically connected to the first electrode layer (for example, the positive electrode plate 11). In the example shown in FIG. 3, the first through-conductor 20A is connected to the first conductor wiring layer 40A provided on a surface of the sealing layer 30 at an end portion.

In addition, as shown in FIG. 3, it is preferable that the first through-conductor 20A is electrically connected to the positive electrode plate 11 at the inner wall surface of the first through-hole 50A. More specifically, it is preferable that the first through-conductor 20A is electrically connected to an end surface of the positive electrode plate 11 facing the inner wall surface of the first through-hole 50A in the plane direction. In this case, a space between the end surface of the positive electrode plate 11 and the first through-conductor 20A is not filled with an insulating material such as the sealing layer 30.

It is preferable that the core portion 11A and the porous portion 11B are exposed on the end surface of the positive electrode plate 11 electrically connected to the first through-conductor 20A, as shown in FIG. 3. In this case, in addition to the core portion 11A, the porous portion 11B is also electrically connected to the first through-conductor 20A.

It is preferable that the first through-conductor 20A is electrically connected to the positive electrode plate 11 over an entire circumference of the first through-hole 50A when viewed in the thickness direction of the positive electrode plate 11.

The first through-conductor 20A may be electrically connected to the positive electrode plate 11 via a positive electrode connecting layer or may be directly connected to the end surface of the positive electrode plate 11.

As shown in FIG. 3, the second through-conductor 20B is provided on at least an inner wall surface of a second through-hole 50B that penetrates the capacitor element 10 in the thickness direction. That is, the second through-conductor 20B may be provided only on the inner wall surface of the second through-hole 50B or may be provided in an entire inside of the second through-hole 50B. In a case where the second through-conductor 20B is provided only on the inner wall surface of the second through-hole 50B, a space surrounded by the second through-conductor 20B in the second through-hole 50B may be filled with a material containing a resin. That is, a second resin filling portion 25B may be provided in an inner side portion of the second through-conductor 20B. In the example shown in FIG. 3, the second through-conductor 20B is provided on the inner wall surface of the second through-hole 50B that penetrates the sealing layer 30 and the capacitor element 10 in the thickness direction.

As shown in FIGS. 1 and 2, it is preferable that the second through-conductor 20B is present in the negative electrode layer 12 in plan view of the positive electrode plate 11 in the thickness direction.

As shown in FIG. 3, the second through-conductor 20B is electrically connected to the second electrode layer (for example, the negative electrode layer 12). In the example shown in FIG. 3, the second through-conductor 20B is connected to the second conductor wiring layer 40B provided on the surface of the sealing layer 30 at an end portion.

In addition, as shown in FIG. 3, it is preferable that a space between the end surface of the positive electrode plate 11 and the second through-conductor 20B is filled with an insulating material such as the sealing layer 30.

The sealing layer 30 is provided to cover the capacitor element 10. The capacitor element 10 is protected by the sealing layer 30.

As shown in FIG. 3, it is preferable that the sealing layer 30 is provided on both main surfaces of the capacitor element 10 opposite to each other in the thickness direction.

As shown in FIGS. 2 and 3, the capacitor element 10 may further include an insulating layer 35 provided around the first through-conductor 20A or the second through-conductor 20B on at least one main surface of the positive electrode plate 11.

In addition, as shown in FIG. 2, the capacitor element 10 may further include the insulating layer 35 that is provided to surround a periphery of the negative electrode layer 12 on at least one main surface of the positive electrode plate 11.

The first conductor wiring layer 40A is provided on the surface of the sealing layer 30 and is electrically connected to the first through-conductor 20A. In the example shown in FIG. 3, the first conductor wiring layer 40A is provided on a surface of the first through-conductor 20A and functions as a connection terminal of the capacitor element 10.

Specifically, in the example shown in FIG. 3, the first conductor wiring layer 40A is electrically connected to the positive electrode plate 11 via the first through-conductor 20A, and functions as a connection terminal for the positive electrode plate 11.

The second conductor wiring layer 40B is provided on the surface of the sealing layer 30 and is electrically connected to the second through-conductor 20B. In the example shown in FIG. 3, the second conductor wiring layer 40B is provided on a surface of the second through-conductor 20B and functions as a connection terminal of the capacitor element 10.

Specifically, in the example shown in FIG. 3, the second conductor wiring layer 40B is electrically connected to the negative electrode layer 12 via a via-conductor 45 provided inside the sealing layer 30, and functions as a connection terminal for the negative electrode layer 12.

Figure 4:
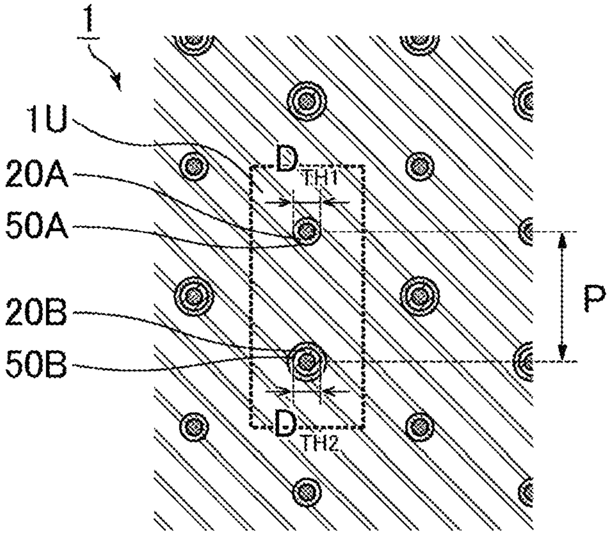
FIG. 4 is an example of a plan view of the capacitor array shown in FIG. 3 taken along a line IV-IV.

FIG. 4 is an example of a plan view of the capacitor array shown in FIG. 3 taken along a line IV-IV.

As shown in FIG. 4, an area of the capacitor unit 1U, a diameter of the first through-hole 50A (a length indicated by $D_{TH1}$ in FIG. 4), an area of the first through-conductor 20A in the first through-hole 50A, a diameter of the second through-hole 50B (a length indicated by $D_{TH2}$ in FIG. 4), an area of the second through-conductor 20B in the second through-hole 50B, and an inter-center distance between the first through-conductor 20A and the second through-conductor 20B (a length indicated by P in FIG. 4) are equivalent between the capacitor units 1U in plan view of the capacitor array 1 in the thickness direction.

In the present specification, the expression "are equivalent" does not mean that things are completely equivalent, but means that the things are substantially equivalent, for example, a difference of about several percent is also included.

In the present specification, a diameter of a through-hole means a diameter in a case where the through-hole has a circular planar shape, and an equivalent circle diameter in a case where the through-hole has a shape other than a circular shape.

In the present specification, a center of a through-conductor means a center of a minimum circle that encompasses the through-conductor in plan view of the capacitor array in the thickness direction. Therefore, an inter-center distance between the first through-conductor and the second through-conductor means a length of a line segment connecting a center of the first through-conductor and a center of the second through-conductor, which are obtained by the above-described method. The same applies to an inter-center distance between the first through-conductor and the first through-conductor, and an inter-center distance between the second through-conductor and the second through-conductor, which will be described later.

It is preferable that shapes of the capacitor units 1U are equivalent between the capacitor units 1U in plan view of the capacitor array 1 in the thickness direction.

It is preferable that shapes of the first through-conductors 20A constituting the capacitor units 1U are equivalent between the capacitor units 1U in plan view of the capacitor array 1 in the thickness direction.

It is preferable that shapes of the second through-conductors 20B constituting the capacitor units 1U are equivalent between the capacitor units 1U in plan view of the capacitor array 1 in the thickness direction.

In one of the capacitor units 1U, the diameter of the first through-hole 50A may be different from the diameter of the second through-hole 50B, but is preferably equivalent to the diameter of the second through-hole 50B. Therefore, it is preferable that the diameter of the first through-hole 50A is equivalent to the diameter of the second through-hole 50B in all the capacitor units 1U.

In one of the capacitor units 1U, the area of the first through-conductor 20A in the first through-hole 50A may be different from the area of the second through-conductor 20B in the second through-hole 50B, but is preferably equivalent to the area of the second through-conductor 20B in the second through-hole 50B. Therefore, it is preferable that the area of the first through-conductor 20A in the first through-hole 50A is equivalent to the area of the second through-conductor 20B in the second through-hole 50B in all the capacitor units 1U.

In the capacitor array 1, in a case where a correlation of the electrostatic capacity $C_{unit}$ per unit with respect to the inter-center distance p between the first through-conductor and the second through-conductor is obtained from virtual units by a method shown in (1) and (2) below, actual overall capacitance corresponding to an electrostatic capacity for a total area of the capacitor units 1U in an electrostatic capacity of the entire capacitor array 1 is larger than virtual overall capacitance obtained by multiplying a total number n of the virtual units corresponding to the inter-center distance p when the electrostatic capacity $C_{unit}$ per unit reaches a maximum value by the maximum value of the electrostatic capacity $C_{unit}$ per unit.

(1) It is assumed that, when the area of the first through-conductor 20A in the first through-hole 50A is denoted by $S_{TH1}$ and the area of the second through-conductor 20B in the second through-hole 50B is denoted by $S_{TH2}$ in the capacitor unit 1U, and a total number of the capacitor units 1U included in the capacitor array 1 is denoted by N, virtual units satisfying all of Conditions 1 to 4 below are included in the capacitor array 1 instead of the capacitor units 1U.

Condition 1: the total number of the virtual units included in the capacitor array 1 is denoted by n.

Condition 2: an area of the virtual unit, the diameter of the first through-hole, the area of the first through-conductor in the first through-hole, the diameter of the second through-hole, the area of the second through-conductor in the second through-hole, and the inter-center distance between the first through-conductor and the second through-conductor are equivalent between the virtual units in plan view of the capacitor array 1 in the thickness direction.

It is preferable that shapes of the virtual units are equivalent between the virtual units in plan view of the capacitor array 1 in the thickness direction.

It is preferable that the shapes of the first through-conductors constituting the virtual units are equivalent between the virtual units in plan view of the capacitor array 1 in the thickness direction.

It is preferable that the shapes of the second through-conductors constituting the virtual units are equivalent between the virtual units in plan view of the capacitor array 1 in the thickness direction.

In the same virtual unit, the diameter of the first through-hole may be different from the diameter of the second through-hole, but is preferably equivalent to the diameter$_2$ of the second through-hole. Therefore, it is preferable that the diameter of the first through-hole is the equivalent to the diameter of the second through-hole in all the virtual units.

In the same virtual unit, the area of the first through-conductor in the first through-hole may be different from the area of the second through-conductor in the second through-hole, but is preferably equivalent to the area of the second through-conductor in the second through-hole. Therefore, it is preferable that the area of the first through-conductor in the first through-hole is equivalent to the area of the second through-conductor in the second through-hole in all the virtual units.

Condition 3: the area of the first through-conductor in the first through-hole is denoted by $S_{th1}$ and the area of the second through-conductor in the second through-hole is denoted by $S_{th2}$ in the virtual unit.

$$\text{a value of } (s_{th1} + s_{th2}) \times n \text{ is equal to a value of } (S_{TH1} + S_{TH2}) \times N. \qquad \text{Condition 4}$$

(2) The correlation of an electrostatic capacity $C_{unit}$ per unit with respect to an inter-center distance p between the first through-conductor and the second through-conductor is obtained from the virtual units.

Since an occupied area of the capacitor array 1 is constant, in the virtual unit, the area of the virtual unit, the diameter of the first through-hole, and the diameter of the second through-hole are determined according to the inter-center distance p between the first through-conductor and the second through-conductor such that the value of $(S_{th1}+S_{th2})\times n$ is equal to the value of $(S_{TH1}+S_{TH2})\times N$. As a result, the electrostatic capacity $C_{unit}$ per unit is obtained.

Further, the virtual overall capacitance is obtained by multiplying the total number n of the virtual units corresponding to the inter-center distance p by the electrostatic capacity $C_{unit}$ per unit.

Figure 5:
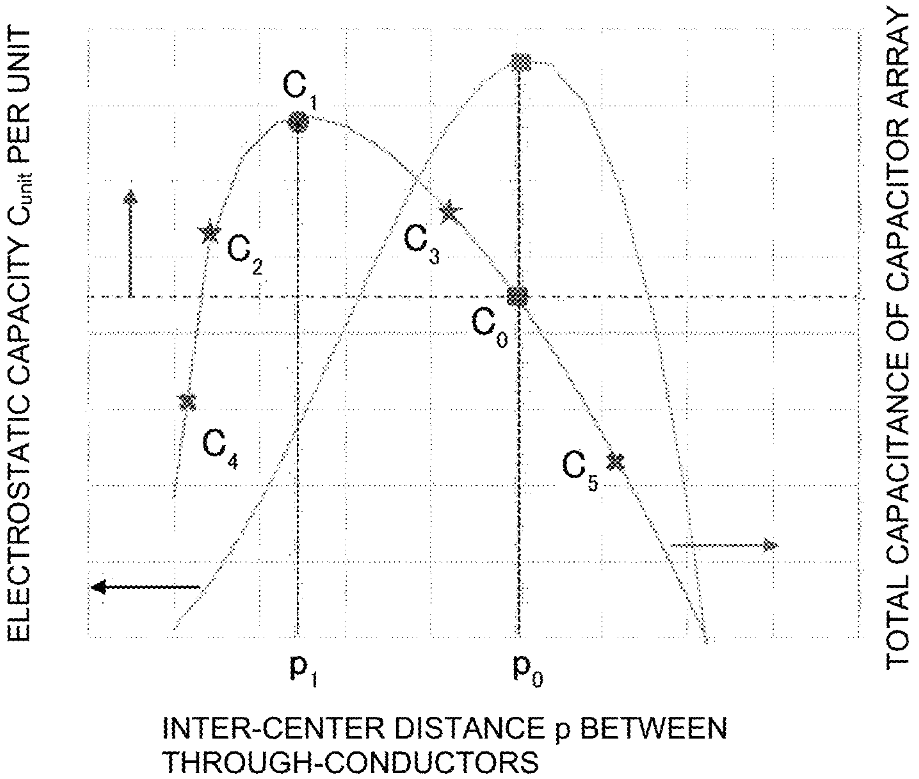
FIG. 5 is an example of a graph showing a correlation of an electrostatic capacity $C_{unit}$ per unit or virtual overall capacitance with respect to an inter-center distance p between a first through-conductor and a second through-conductor.

FIG. 5 is an example of a graph showing a correlation of the electrostatic capacity $C_{unit}$ per unit or the virtual overall capacitance with respect to the inter-center distance p between the first through-conductor and the second through-conductor.

As shown in FIG. 5, it can be seen that the inter-center distance p when the electrostatic capacity $C_{unit}$ per unit reaches the maximum value ($p_0$ in FIG. 5) does not coincide with the inter-center distance p when the virtual overall capacitance reaches a maximum value ($p_1$ in FIG. 5).

As described above, in the capacitor array 1, the actual overall capacitance corresponding to the electrostatic capacity for the total area of the capacitor units 1U in the electrostatic capacity of the entire capacitor array 1 is larger than virtual overall capacitance obtained by multiplying the total number n of the virtual units corresponding to the inter-center distance p when the electrostatic capacity $C_{unit}$ per unit reaches the maximum value by the maximum value of the electrostatic capacity $C_{unit}$ per unit.

Here, when the electrostatic capacity of the entire capacitor array 1 is denoted by $C_{total}$, the total area of the capacitor units 1U (that is, a value of the area of the capacitor unit 1U×N) is denoted by $S_1$, and the area of the entire capacitor array 1 is denoted by $S_2$, the actual overall capacitance C is defined by $C=C_{total}\chi S_1/S_2$. The total area $S_1$ of the capacitor units 1U may be the same as the area $S_2$ of the entire capacitor array 1, or may be smaller than the area $S_2$ of the entire capacitor array 1. Therefore, the actual overall capacitance of the capacitor array 1 need not coincide with the electrostatic capacity of the entire capacitor array 1. For example, in FIG. 11 to be described later, an electrostatic capacity of a portion located in an outer side portion of a first unit 1UA and a fourth unit 1UD which are parts of the capacitor unit 1U is included in the actual total capacitance.

In the example shown in FIG. 5, the virtual overall capacitance obtained by multiplying the total number n of the virtual units corresponding to the inter-center distance p when the electrostatic capacity $C_{unit}$ per unit reaches the maximum value ($p_0$ in FIG. 5) by the maximum value of the electrostatic capacity $C_{unit}$ per unit is indicated by $C_0$. Therefore, a capacitor array having actual overall capacitance larger than the electrostatic capacity indicated by $C_0$ is within the scope of the present disclosure. For example, a capacitor array in which an electrostatic capacity indicated by $C_1$, $C_2$, or $C_3$ in FIG. 5 is actual overall capacitance is within the scope of the present disclosure. On the other hand, a capacitor array in which an electrostatic capacity indicated by $C_4$ or $C_5$ in FIG. 5 is actual overall capacitance is out of the scope of the present disclosure.

As described above, in the capacitor array 1, an overall electrostatic capacity can be increased with respect to a conductor amount of a through-conductor required according to an amount of current.

Figure 6:
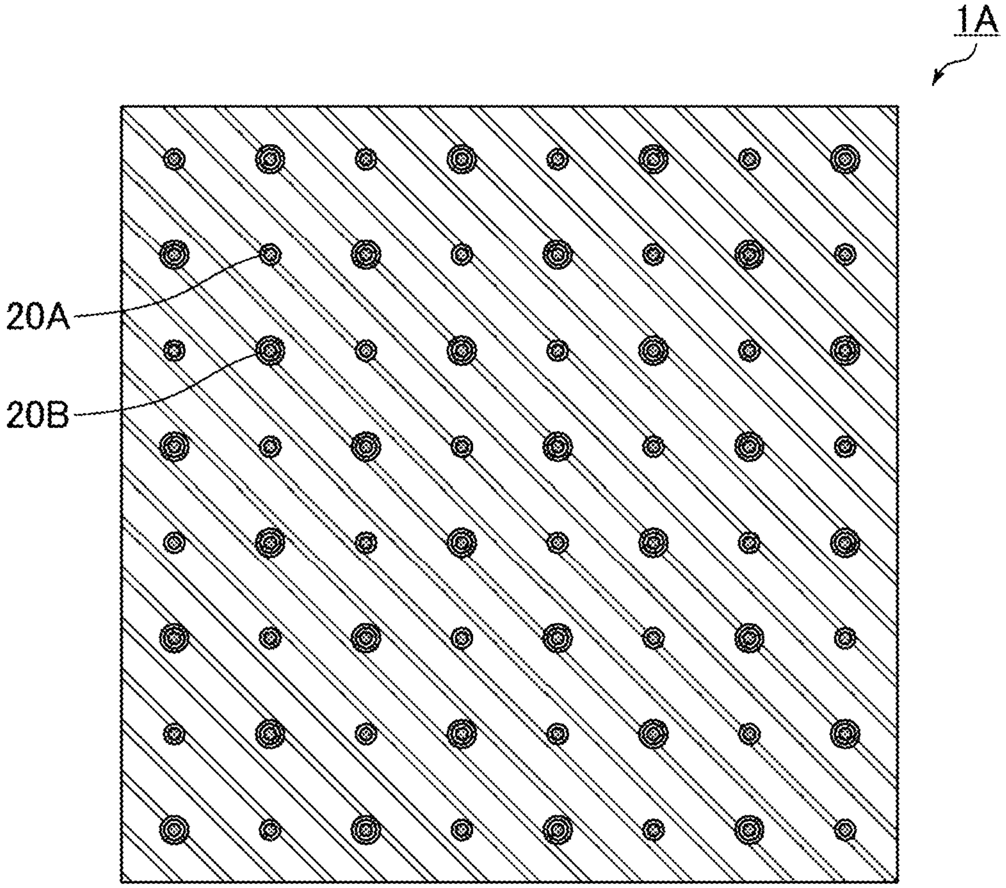
FIG. 6 is a plan view schematically showing an example of an arrangement of the first through-conductor and the second through-conductor in the capacitor array according to the present disclosure.

FIG. 6 is a plan view schematically showing an example of an arrangement of the first through-conductor and the second through-conductor in the capacitor array according to the present disclosure. The plan view shown in FIG. 6 is a plan view at the same position as that in FIG. 4 (a position of the line IV-IV in FIG. 3).

In a capacitor array 1A shown in FIG. 6, the first through-conductors 20A and the second through-conductors 20B are in a square arrangement as a whole. In the square arrangement, the first through-conductor 20A or the second through-conductor 20B is arranged at each vertex of a square shape. In the example shown in FIG. 6, the first through-conductors 20A and the second through-conductors 20B are alternately arranged from an upper side to a lower side, and the first through-conductors 20A and the second through-conductors 20B are alternately arranged from a left side to a right side.

Figure 7:
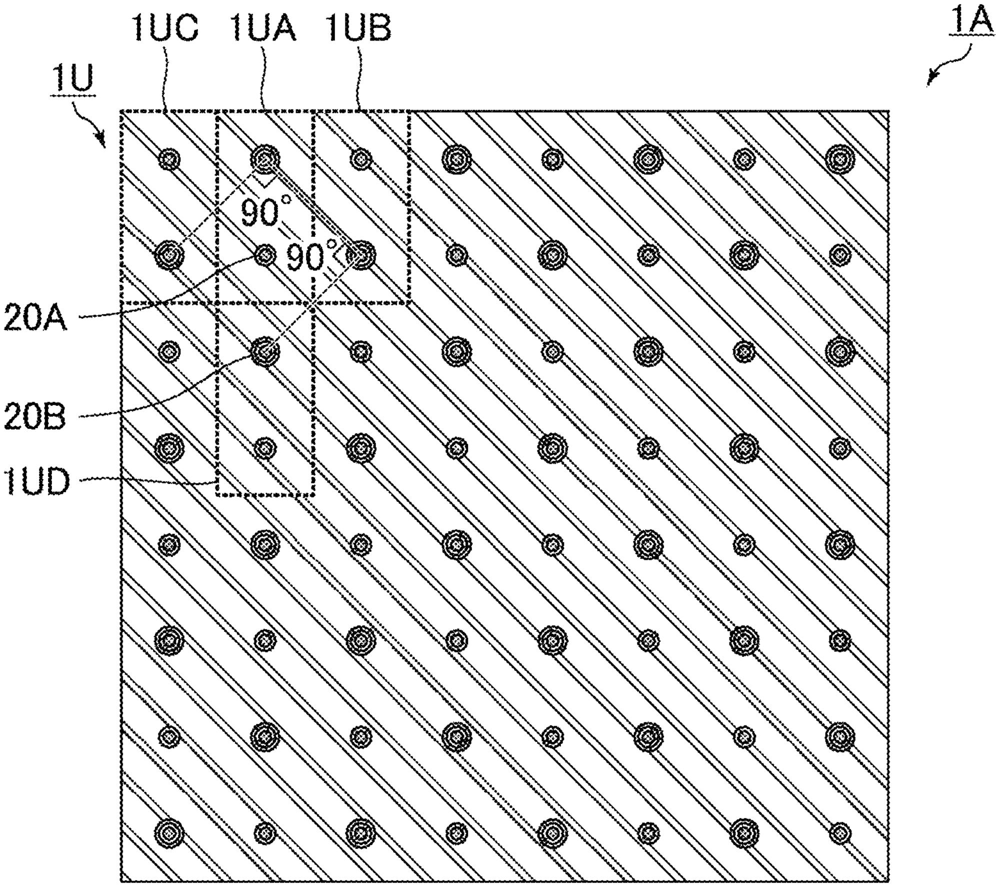
FIG. 7 is a plan view for describing an example of the arrangement shown in FIG. 6.

FIG. 7 is a plan view for describing an example of the arrangement shown in FIG. 6.

In FIG. 7, the capacitor unit 1U includes the first unit 1UA and a second unit 1UB adjacent to the first unit 1UA.

It is preferable that an inter-center distance between the first through-conductor 20A of the first unit 1UA and the second through-conductor 20B of the first unit 1UA is equivalent to an inter-center distance between the first through-conductor 20A of the first unit 1UA and the second through-conductor 20B of the second unit 1UB in plan view of the capacitor array 1A in the thickness direction, as shown in FIG. 7.

As shown in FIG. 7, by forming current paths in parallel with respect to the capacitor array 1A, an equivalent series resistance and an equivalent series inductance can be reduced. Further, by making the inter-center distance between the first through-conductor 20A and the second through-conductor 20B uniform, an impedance difference between the current paths can be reduced. In addition, it is also possible to disperse heat generation of the capacitor array 1A and increase the current capacitance.

It is preferable that the capacitor unit 1U further includes the third unit 1UC adjacent to the first unit 1UA, and an inter-center distance between the second through-conductor 20B of the first unit 1UA and the second through-conductor 20B of the second unit 1UB is equivalent to an inter-center distance between the second through-conductor 20B of the first unit 1UA and the second through-conductor 20B of the third unit 1UC in plan view of the capacitor array 1A in the thickness direction, as shown in FIG. 7.

In a case where the capacitor unit 1U includes the third unit 1UC, it is preferable that the second through-conductor 20B of the third unit 1UC is present on a straight line obtained by rotating a line segment connecting a center of the second through-conductor 20B of the first unit 1UA and a center of the second through-conductor 20B of the second unit 1UB by an angle of 90 degrees or 180 degrees with the center of the second through-conductor 20B of the first unit 1UA as a reference in plan view of the capacitor array 1A in the thickness direction, as shown in FIG. 7. In this case, it is sufficient that a minimum circle that encompasses the second through-conductors 20B of the third unit 1UC is present on a straight line obtained by rotating the line segment connecting the center of the second through-conductor 20B of the first unit 1UA and the center of the second through-conductor 20B of the second unit 1UB by an angle of 90 degrees or 180 degrees with the center of the second through-conductor 20B of the first unit 1UA as a reference in plan view of the capacitor array 1A in the thickness direction.

Further, it is preferable that the capacitor unit 1U further includes the fourth unit 1UD adjacent to the first unit 1UA, and an inter-center distance between the second through-conductor 20B of the second unit 1UB and the second through-conductor 20B of the first unit 1UA is equivalent to an inter-center distance between the second through-conductor 20B of the second unit 1UB and the second through-conductor 20B of the fourth unit 1UD in plan view of the capacitor array 1A in the thickness direction, as shown in FIG. 7.

In a case where the capacitor unit 1U includes the fourth unit 1UD, it is preferable that the second through-conductor 20B of the fourth unit 1UD is present on a straight line obtained by rotating a line segment connecting the center of the second through-conductor 20B of the second unit 1UB and the center of the second through-conductor 20B of the first unit 1UA by an angle of 90 degrees or 180 degrees with the center of the second through-conductor 20B of the second unit 1UB as a reference in plan view of the capacitor array 1A in the thickness direction, as shown in FIG. 7. In this case, it is sufficient that a minimum circle that encompasses the second through-conductor 20B of the fourth unit 1UD is present on the straight line obtained by rotating the line segment connecting the center of the second through-conductor 20B of the second unit 1UB and the center of the second through-conductor 20B of the first unit 1UA by an angle of 90 degrees or 180 degrees with the center of the second through-conductor 20B of the second unit 1UB as the reference in plan view of the capacitor array 1A in the thickness direction.

In the example shown in FIG. 7, it is preferable that the number of the second through-conductors 20B present inside a circle with an inter-center distance between the first through-conductor 20A of the first unit 1UA and the first through-conductor 20A of the second unit 1UB as a radius and a center of the first through-conductor 20A of the first unit 1UA as a center, and the number of the second through-conductors 20B present inside a circle with the inter-center distance between the first through-conductor 20A of the first unit 1UA and the first through-conductor 20A of the second unit 1UB as a radius and a center of the first through-conductor 20A of the second unit 1UB as a center are the same in plan view of the capacitor array 1A in the thickness direction.

As shown in FIG. 7, by arranging the capacitor units 1U evenly and in parallel on the current paths that are evenly arranged, a noise removal effect can be enhanced.

In particular, it is preferable that a difference between a total area of the second through-conductor 20B that overlaps the circle with the inter-center distance between the first through-conductor 20A of the first unit 1UA and the first through-conductor 20A of the second unit 1UB as the radius and the center of the first through-conductor 20A of the first unit 1UA as the center and a total area of the second through-conductor 20B present inside the circle with the inter-center distance between the first through-conductor 20A of the first unit 1UA and the first through-conductor 20A of the second unit 1UB as the radius and the center of the first through-conductor 20A of the second unit 1UB as the center is within ±5% in plan view of the capacitor array 1A in the thickness direction.

Figure 8:
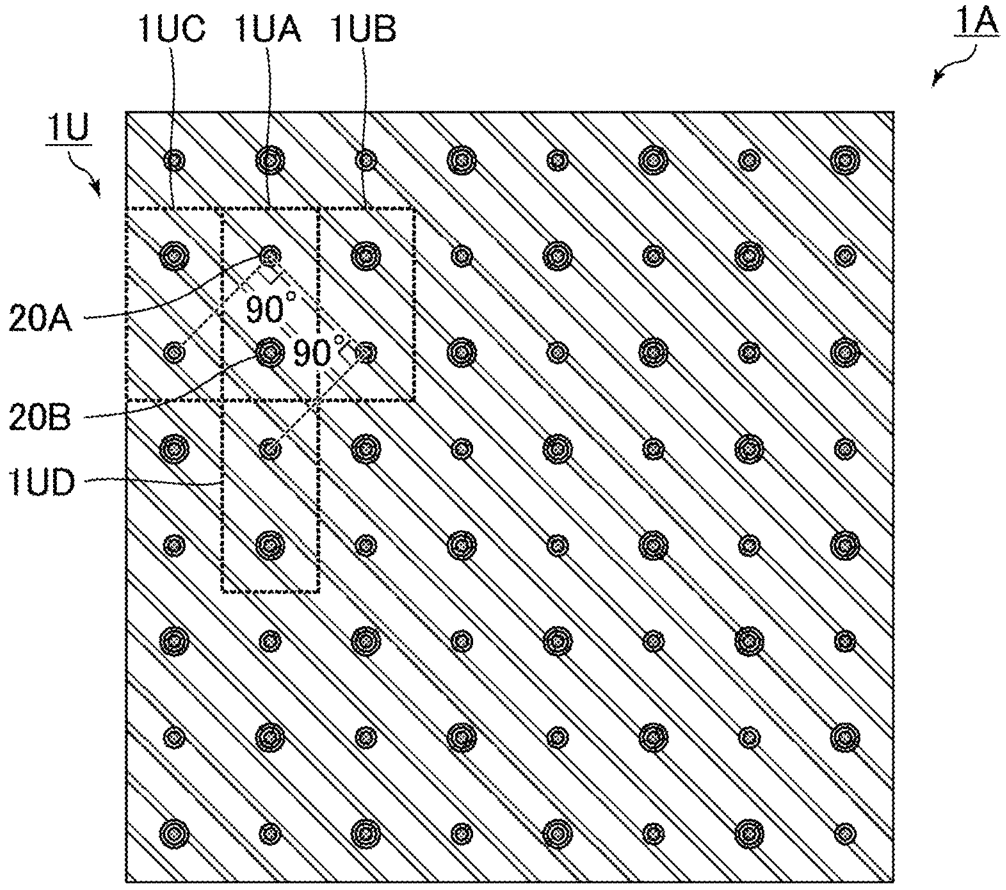
FIG. 8 is a plan view for describing another example of the arrangement shown in FIG. 6.

FIG. 8 is a plan view for describing another example of the arrangement shown in FIG. 6.

In FIG. 8, the capacitor unit 1U includes the first unit 1UA and the second unit 1UB adjacent to the first unit 1UA.

It is preferable that the inter-center distance between the second through-conductor 20B of the first unit 1UA and the first through-conductor 20A of the first unit 1UA is equivalent to an inter-center distance between the second through-conductor 20B of the first unit 1UA and the first through-conductor 20A of the second unit 1UB in plan view of the capacitor array 1A in the thickness direction, as shown in FIG. 8.

As shown in FIG. 8, by forming current paths in parallel with respect to the capacitor array 1A, an equivalent series resistance and an equivalent series inductance can be reduced. Further, by making the inter-center distance between the first through-conductor 20A and the second through-conductor 20B uniform, an impedance difference between the current paths can be reduced. In addition, it is also possible to disperse heat generation of the capacitor array 1A and increase the current capacitance.

It is preferable that the capacitor unit 1U further includes the third unit 1UC adjacent to the first unit 1UA, and the inter-center distance between the first through-conductor 20A of the first unit 1UA and the first through-conductor 20A of the second unit 1UB is equivalent to an inter-center distance between the first through-conductor 20A of the first unit 1UA and the first through-conductor 20A of the third unit 1UC in plan view of the capacitor array 1A in the thickness direction, as shown in FIG. 8.

In a case where the capacitor unit 1U includes the third unit 1UC, it is preferable that the first through-conductor 20A of the third unit 1UC is present on a straight line obtained by rotating a line segment connecting the center of the first through-conductor 20A of the first unit 1UA and the center of the first through-conductor 20A of the second unit 1UB by an angle of 90 degrees or 180 degrees with the center of the first through-conductor 20A of the first unit 1UA as a reference in plan view of the capacitor array 1A in the thickness direction, as shown in FIG. 8. In this case, it is sufficient that a minimum circle that encompasses the first through-conductors 20A of the third unit 1UC is present on the straight line obtained by rotating the line segment connecting the center of the first through-conductor 20A of the first unit 1UA and the center of the first through-conductor 20A of the second unit 1UB by an angle of 90 degrees or 180 degrees with the center of the first through-conductor 20A of the first unit 1UA as the reference in plan view of the capacitor array 1A in the thickness direction.

Further, it is preferable that the capacitor unit 1U further includes the fourth unit 1UD adjacent to the first unit 1UA, and the inter-center distance between the first through-conductor 20A of the second unit 1UB and the first through-conductor 20A of the first unit 1UA is equivalent to an inter-center distance between the first through-conductor 20A of the second unit 1UB and the first through-conductor 20A of the fourth unit 1UD in plan view of the capacitor array 1A in the thickness direction, as shown in FIG. 8.

In a case where the capacitor unit 1U includes the fourth unit 1UD, it is preferable that the first through-conductor 20A of the fourth unit 1UD is present on a straight line obtained by rotating the line segment connecting the center of the first through-conductor 20A of the second unit 1UB and the center of the first through-conductor 20A of the first unit 1UA by an angle of 90 degrees or 180 degrees with the center of the first through-conductor 20A of the second unit 1UB as a reference in plan view of the capacitor array 1A in the thickness direction, as shown in FIG. 8. In this case, it is sufficient that a minimum circle that encompasses the first through-conductor 20A of the fourth unit 1UD is present on the straight line obtained by rotating the line segment connecting the center of the first through-conductor 20A of the second unit 1UB and the center of the first through-conductor 20A of the first unit 1UA by an angle of 90 degrees or 180 degrees with the center of the first through-conductor 20A of the second unit 1UB as the reference in plan view of the capacitor array 1A in the thickness direction.

In the example shown in FIG. 8, it is preferable that the number of the first through-conductors 20A present inside a circle with the inter-center distance between the second through-conductor 20B of the first unit 1UA and the second through-conductor 20B of the second unit 1UB as a radius and the center of the second through-conductor 20B of the first unit 1UA as a center, and the number of the first through-conductors 20A present inside a circle with the inter-center distance between the second through-conductor 20B of the first unit 1UA and the second through-conductor 20B of the second unit 1UB as a radius and the center of the second through-conductor 20B of the second unit 1UB as a center are the same in plan view of the capacitor array 1A in the thickness direction.

As shown in FIG. 8, by arranging the capacitor units 1U evenly and in parallel on the current paths that are evenly arranged, a noise removal effect can be enhanced.

In particular, it is preferable that a difference between a total area of the first through-conductor 20A that overlaps the circle with the inter-center distance between the second through-conductor 20B of the first unit 1UA and the second through-conductor 20B of the second unit 1UB as the radius and the center of the second through-conductor 20B of the first unit 1UA as the center and a total area of the first through-conductor 20A present inside the circle with the inter-center distance between the second through-conductor 20B of the first unit 1UA and the second through-conductor 20B of the second unit 1UB as the radius and the center of the second through-conductor 20B of the second unit 1UB as the center is within ±5% in plan view of the capacitor array 1A in the thickness direction.

Figure 9:
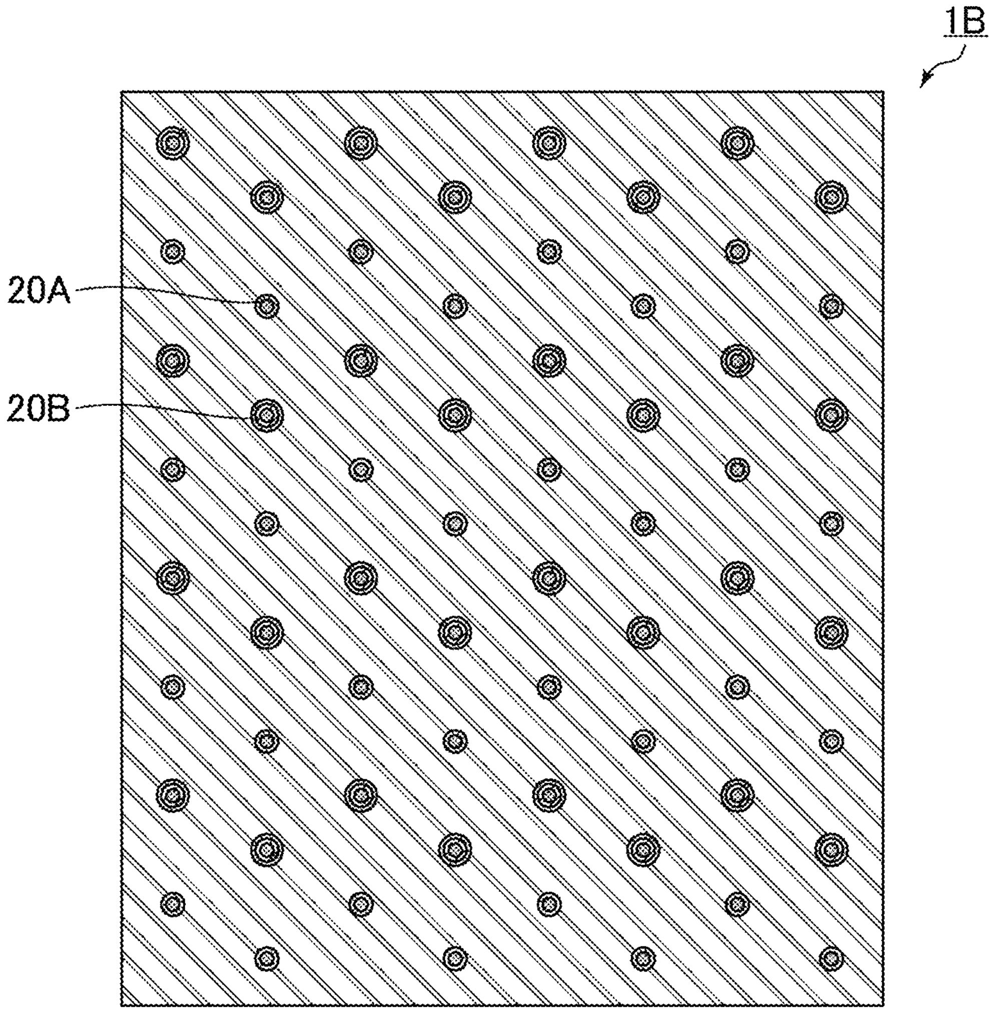
FIG. 9 is a plan view schematically showing another example of the arrangement of the first through-conductor and the second through-conductor in the capacitor array according to the present disclosure.

FIG. 9 is a plan view schematically showing another example of the arrangement of the first through-conductor and the second through-conductor in the capacitor array according to the present disclosure. The plan view shown in FIG. 9 is a plan view at the same position as that in FIG. 4 (the position of the line IV-IV in FIG. 3).

In a capacitor array 1B shown in FIG. 9, the first through-conductors 20A and the second through-conductors 20B are in a hexagonal arrangement as a whole. In the hexagonal arrangement, the first through-conductor 20A or the second through-conductor 20B is arranged at each vertex of a regular hexagonal shape and at a center of the regular hexagonal shape. In the example shown in FIG. 9, the first through-conductors 20A and the second through-conductors 20B are alternately arranged from the upper side to the lower side. In a case where the first through-conductors 20A and the second through-conductors 20B are in the hexagonal arrangement as a whole, for example, two first through-conductors 20A and two second through-conductors 20B may be alternately arranged from the upper side to the lower side.

Figure 10:
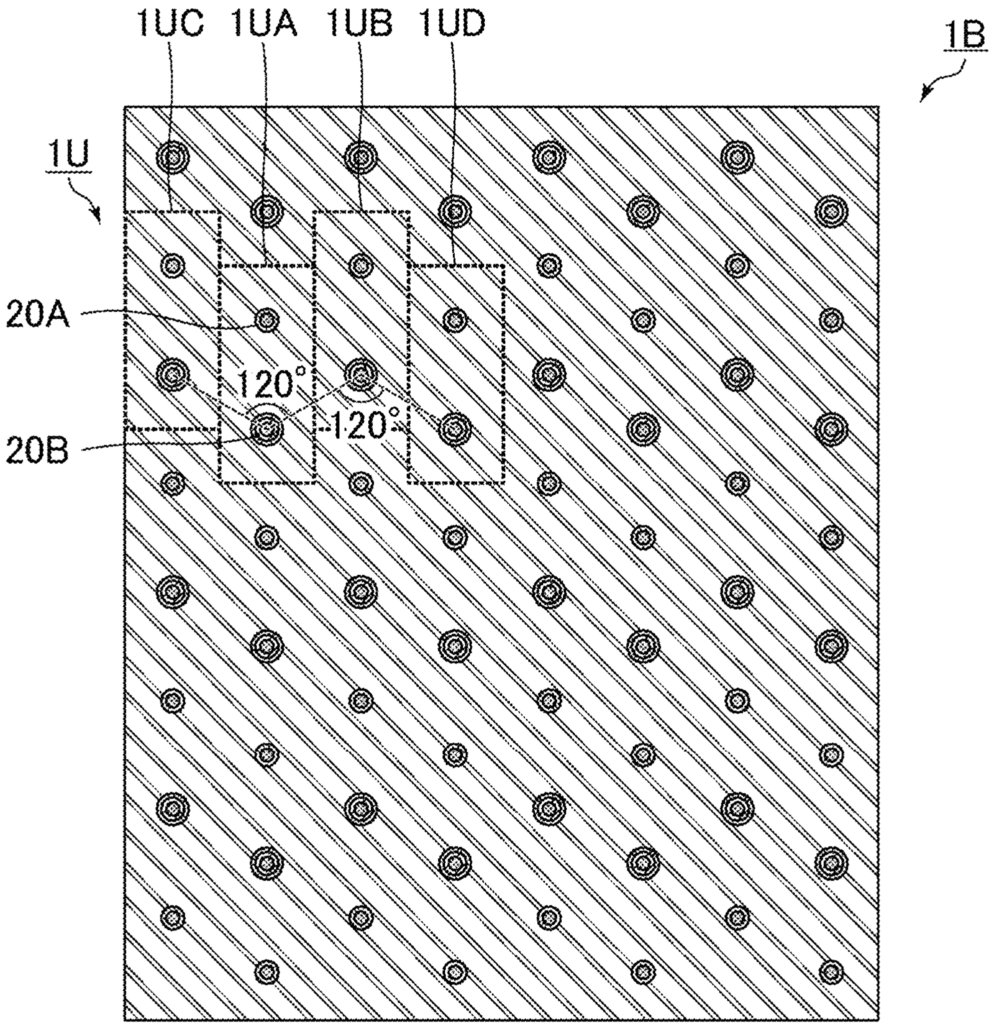
FIG. 10 is a plan view for describing an example of the arrangement shown in FIG. 9.

FIG. 10 is a plan view for describing an example of the arrangement shown in FIG. 9.

In FIG. 10, the capacitor unit 1U includes the first unit 1UA and the second unit 1UB adjacent to the first unit 1UA.

It is preferable that an inter-center distance between the first through-conductor 20A of the first unit 1UA and the second through-conductor 20B of the first unit 1UA is equivalent to an inter-center distance between the first through-conductor 20A of the first unit 1UA and the second through-conductor 20B of the second unit 1UB in plan view of the capacitor array 1B in the thickness direction, as shown in FIG. 10.

It is preferable that the capacitor unit 1U further includes the third unit 1UC adjacent to the first unit 1UA, and an inter-center distance between the second through-conductor 20B of the first unit 1UA and the second through-conductor 20B of the second unit 1UB is equivalent to an inter-center distance between the second through-conductor 20B of the first unit 1UA and the second through-conductor 20B of the third unit 1UC in plan view of the capacitor array 1B in the thickness direction, as shown in FIG. 10.

In a case where the capacitor unit 1U includes the third unit 1UC, it is preferable that the second through-conductor 20B of the third unit 1UC is present on a straight line obtained by rotating a line segment connecting the center of the second through-conductor 20B of the first unit 1UA and the center of the second through-conductor 20B of the second unit 1UB by an angle of 60 degrees or 120 degrees with the center of the second through-conductor 20B of the first unit 1UA as a reference in plan view of the capacitor array 1B in the thickness direction, as shown in FIG. 10. In this case, it is sufficient that a minimum circle that encompasses the second through-conductor 20B of the third unit 1UC is present on the straight line obtained by rotating the line segment connecting the center of the second through-conductor 20B of the first unit 1UA and the center of the second through-conductor 20B of the second unit 1UB by an angle of 60 degrees or 120 degrees with the center of the second through-conductor 20B of the first unit 1UA as the reference in plan view of the capacitor array 1B from the thickness direction.

Further, it is preferable that the capacitor unit 1U further includes the fourth unit 1UD adjacent to the first unit 1UA, and an inter-center distance between the second through-conductor 20B of the second unit 1UB and the second through-conductor 20B of the first unit 1UA is equivalent to an inter-center distance between the second through-conductor 20B of the second unit 1UB and the second through-conductor 20B of the fourth unit 1UD in plan view of the capacitor array 1B in the thickness direction, as shown in FIG. 10.

In a case where the capacitor unit 1U includes the fourth unit 1UD, it is preferable that the second through-conductor 20B of the fourth unit 1UD is present on a straight line obtained by rotating the line segment connecting the center of the second through-conductor 20B of the second unit 1UB and the center of the second through-conductor 20B of the first unit 1UA by an angle of 60 degrees or 120 degrees with the center of the second through-conductor 20B of the second unit 1UB as a reference in plan view of the capacitor array 1B in the thickness direction, as shown in FIG. 10. In this case, it is sufficient that a minimum circle that encompasses the second through-conductor 20B of the fourth unit 1UD is present on the straight line obtained by rotating the line segment connecting the center of the second through-conductor 20B of the second unit 1UB and the center of the second through-conductor 20B of the first unit 1UA by an angle of 60 degrees or 120 degrees with the center of the second through-conductor 20B of the second unit 1UB as the reference in plan view of the capacitor array 1B in the thickness direction.

Figure 11:
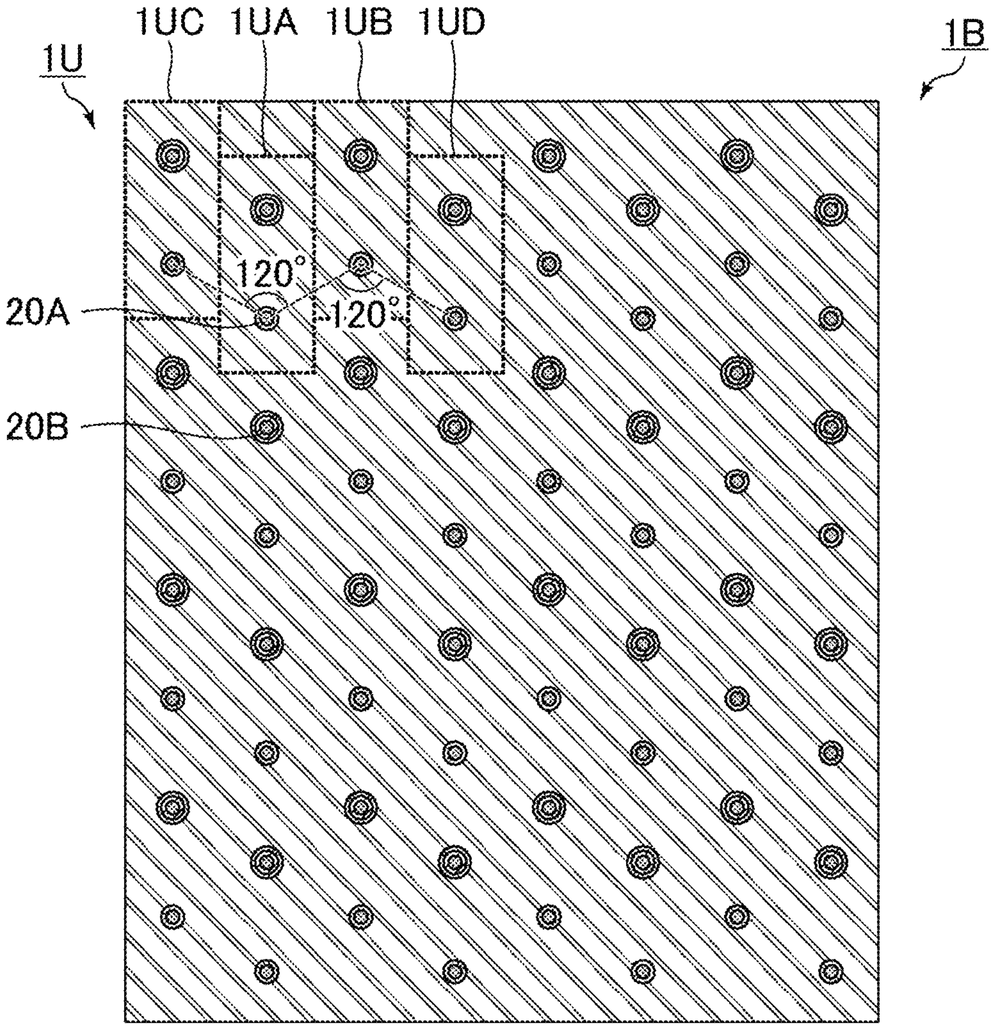
FIG. 11 is a plan view for describing another example of the arrangement shown in FIG. 9.

FIG. 11 is a plan view for describing another example of the arrangement shown in FIG. 9.

In FIG. 11, the capacitor unit 1U includes the first unit 1UA and the second unit 1UB adjacent to the first unit 1UA.

It is preferable that the inter-center distance between the second through-conductor 20B of the first unit 1UA and the first through-conductor 20A of the first unit 1UA is equivalent to an inter-center distance between the second through-conductor 20B of the first unit 1UA and the first through-conductor 20A of the second unit 1UB in plan view of the capacitor array 1B in the thickness direction, as shown in FIG. 11.

It is preferable that the capacitor unit 1U further includes the third unit 1UC adjacent to the first unit 1UA, and the inter-center distance between the first through-conductor 20A of the first unit 1UA and the first through-conductor 20A of the second unit 1UB is equivalent to an inter-center distance between the first through-conductor 20A of the first unit 1UA and the first through-conductor 20A of the third unit 1UC in plan view of the capacitor array 1B in the thickness direction, as shown in FIG. 11.

In a case where the capacitor unit 1U includes the third unit 1UC, it is preferable that the first through-conductor 20A of the third unit 1UC is present on a straight line obtained by rotating a line segment connecting the center of the first through-conductor 20A of the first unit 1UA and the center of the first through-conductor 20A of the second unit 1UB by an angle of 60 degrees or 120 degrees with the center of the first through-conductor 20A of the first unit 1UA as a reference in plan view of the capacitor array 1B in the thickness direction, as shown in FIG. 11. In this case, it is sufficient that a minimum circle that encompasses the first through-conductors 20A of the third unit 1UC is present on the straight line obtained by rotating the line segment connecting the center of the first through-conductor 20A of the first unit 1UA and the center of the first through-conductor 20A of the second unit 1UB by an angle of 60 degrees or 120 degrees with the center of the first through-conductor 20A of the first unit 1UA as the reference in plan view of the capacitor array 1B in the thickness direction.

Further, it is preferable that the capacitor unit 1U further includes the fourth unit 1UD adjacent to the first unit 1UA, and the inter-center distance between the first through-conductor 20A of the second unit 1UB and the first through-conductor 20A of the first unit 1UA is equivalent to an inter-center distance between the first through-conductor 20A of the second unit 1UB and the first through-conductor 20A of the fourth unit 1UD in plan view of the capacitor array 1B in the thickness direction, as shown in FIG. 11.

In a case where the capacitor unit 1U includes the fourth unit 1UD, it is preferable that the first through-conductor 20A of the fourth unit 1UD is present on a straight line obtained by rotating the line segment connecting the center of the first through-conductor 20A of the second unit 1UB and the center of the first through-conductor 20A of the first unit 1UA by an angle of 60 degrees or 120 degrees with the center of the first through-conductor 20A of the second unit 1UB as a reference in plan view of the capacitor array 1B in the thickness direction, as shown in FIG. 11. In this case, it is sufficient that a minimum circle that encompasses the first through-conductor 20A of the fourth unit 1UD is present on the straight line obtained by rotating the line segment connecting the center of the first through-conductor 20A of the second unit 1UB and the center of the first through-conductor 20A of the first unit 1UA by an angle of 60 degrees or 120 degrees with the center of the first through-conductor 20A of the second unit 1UB as the reference in plan view of the capacitor array 1B in the thickness direction.

In a case where the capacitor unit 1U includes the third unit 1UC, it is preferable that the second through-conductor 20B of the third unit 1UC is present on a straight line obtained by rotating a line segment connecting the center of the second through-conductor 20B of the first unit 1UA and the center of the second through-conductor 20B of the second unit 1UB by an angle of 60 degrees, 90 degrees, 120 degrees, or 180 degrees with the center of the second through-conductor 20B of the first unit 1UA as a reference in plan view of the capacitor array 1A or 1B in the thickness direction, as shown in FIGS. 7 and 10.

In a case where the capacitor unit 1U includes the fourth unit 1UD, it is preferable that the second through-conductor 20B of the fourth unit 1UD is present on a straight line obtained by rotating the line segment connecting the center of the second through-conductor 20B of the second unit 1UB and the center of the second through-conductor 20B of the first unit 1UA by an angle of 60 degrees, 90 degrees, 120 degrees, or 180 degrees with the center of the second through-conductor 20B of the second unit 1UB as a reference in plan view of the capacitor array 1A or 1B in the thickness direction, as shown in FIGS. 7 and 10.

In a case where the capacitor unit 1U includes the third unit 1UC, it is preferable that the first through-conductor 20A of the third unit 1UC is present on a straight line obtained by rotating a line segment connecting the center of the first through-conductor 20A of the first unit 1UA and the center of the first through-conductor 20A of the second unit 1UB by an angle of 60 degrees, 90 degrees, 120 degrees, or 180 degrees with the center of the first through-conductor 20A of the first unit 1UA as a reference in plan view of the capacitor array 1A or 1B in the thickness direction, as shown in FIGS. 8 and 11.

In a case where the capacitor unit 1U includes the fourth unit 1UD, it is preferable that the first through-conductor 20A of the fourth unit 1UD is present on a straight line obtained by rotating a line segment connecting the center of the first through-conductor 20A of the second unit 1UB and the center of the first through-conductor 20A of the first unit 1UA by an angle of 60 degrees, 90 degrees, 120 degrees, or 180 degrees with the center of the first through-conductor 20A of the second unit 1UB as a reference in plan view of the capacitor array 1A or 1B in the thickness direction, as shown in FIGS. 8 and 11.

Figure 12:
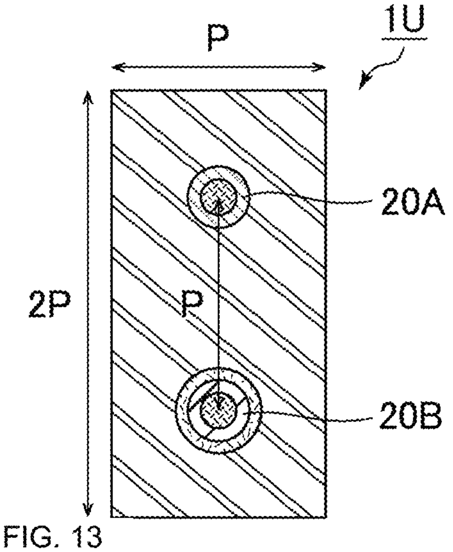
FIG. 12 is a plan view showing an example of the capacitor unit in the arrangement shown in FIG. 6.

FIG. 12 is a plan view showing an example of the capacitor unit in the arrangement shown in FIG. 6.

When the inter-center distance between the first through-conductor 20A and the second through-conductor 20B is denoted by P, it is preferable that the area of the capacitor unit 1U is represented by 2P×P in plan view of the capacitor array 1A (refer to FIG. 6) in the thickness direction, as in FIG. 12.

Figure 13:
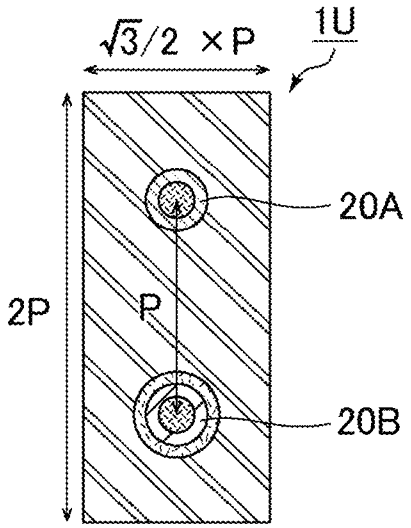
FIG. 13 is a plan view showing an example of the capacitor unit in the arrangement shown in FIG. 9.

FIG. 13 is a plan view showing an example of the capacitor unit in the arrangement shown in FIG. 9.

When the inter-center distance between the first through-conductor 20A and the second through-conductor 20B is denoted by P, it is preferable that the area of the capacitor unit 1U is represented by $2P\times\sqrt{3}/2\times P$ in plan view of the capacitor array 1B (refer to FIG. 9) in the thickness direction, as in FIG. 13.

Hereinafter, the detailed configuration of the capacitor array 1, 1A, or 1B will be described.

Examples of a planar shape of the capacitor unit 1U as viewed in the thickness direction include a polygonal shape such as a rectangular shape (square or rectangle), a quadrangular shape other than a rectangular shape, a triangle, a pentagon, or a hexagon, a circular shape, an elliptical shape, and a shape obtained by combining these shapes. In addition, the planar shape of the capacitor unit 1U may be an L-shape, a C-shape (a shape of a letter C), a step shape, or the like.

The positive electrode plate 11 is preferably formed of valve action metal exhibiting a so-called valve action. Examples of the valve action metal include pure metal such as aluminum, tantalum, niobium, titanium, or zirconium, and an alloy containing at least one of these kinds of metal. Among these, aluminum or an aluminum alloy is preferable.

The shape of the positive electrode plate 11 is preferably a flat plate shape and more preferably a foil shape. In the present specification, the term "plate shape" also includes "foil shape".

The positive electrode plate 11 need only have the porous portion 11B on at least one main surface of the core portion 11A. That is, the positive electrode plate 11 may include the porous portion 11B only on one main surface of the core portion 11A, or may include the porous portion 11B on both main surfaces of the core portion 11A. The porous portion 11B is preferably a porous layer formed on a surface of the core portion 11A, and more preferably an etching layer.

A thickness of the positive electrode plate 11 before an etching treatment is preferably 60 μm to 200 μm. A thickness of the core portion 11A that is not etched after the etching treatment is preferably 15 μm to 70 μm. A thickness of the porous portion 11B is designed according to a required withstand voltage and electrostatic capacity, but is preferably 10 μm to 180 μm in total of the porous portions 11B on both sides of the core portion 11A.

A pore diameter of the porous portion 11B is preferably 10 nm to 600 nm. The pore diameter of the porous portion 11B means a median diameter D50 measured by a mercury porosimeter. The pore diameter of the porous portion 11B can be controlled, for example, by adjusting various conditions in etching.

The dielectric layer 13 provided on the surface of the porous portion 11B is porous by reflecting a surface state of the porous portion 11B, and has a fine uneven surface shape. The dielectric layer 13 preferably consists of an oxide film of the above-described valve action metal. For example, in a case where an aluminum foil is used as the positive electrode plate 11, the dielectric layer 13 consisting of an oxide film can be formed by performing an anodization treatment (also referred to as a chemical conversion treatment) on a surface of the aluminum foil in an aqueous solution containing ammonium adipate or the like.

A thickness of the dielectric layer 13 is designed according to a required withstand voltage and electrostatic capacity, but is preferably 10 nm to 100 nm.

In a case where the negative electrode layer 12 includes the solid electrolyte layer 12A, examples of a material forming the solid electrolyte layer 12A include conductive polymers such as polypyrroles, polythiophenes, and polyanilines. Among these, polythiophenes are preferable, and poly(3,4-ethylenedioxythiophene) called PEDOT is particularly preferable. In addition, the conductive polymers may contain a dopant such as polystyrene sulfonic acid (PSS). The solid electrolyte layer 12A preferably includes an inner layer with which the pores (recesses) of the dielectric layer 13 are filled and an outer layer that covers the dielectric layer 13.

A thickness of the solid electrolyte layer 12A from the surface of the porous portion 11B is preferably 2 μm to 20 μm.

The solid electrolyte layer 12A is formed by, for example, a method of forming a polymerized film such as poly(3,4-ethylenedioxythiophene) on the surface of the dielectric layer 13 using a treatment liquid containing a monomer such as 3,4-ethylenedioxythiophene, a method of applying a dispersion liquid of a polymer such as poly(3,4-ethylenedioxythiophene) to the surface of the dielectric layer 13 and drying the dispersion liquid, or the like.

The solid electrolyte layer 12A can be formed in a predetermined region by applying the above-described treatment liquid or dispersion liquid to the surface of the dielectric layer 13 by a method such as sponge transfer, screen printing, dispenser coating, or inkjet printing.

In a case where the negative electrode layer 12 includes the conductor layer 12B, the conductor layer 12B includes at least one layer of a conductive resin layer or a metal layer. The conductor layer 12B may be only the conductive resin layer or only the metal layer. It is preferable that the conductor layer 12B covers the entire surface of the solid electrolyte layer 12A.

Examples of the conductive resin layer include a conductive adhesive layer containing at least one conductive filler selected from a group consisting of a silver filler, a copper filler, a nickel filler, and a carbon filler.

Examples of the metal layer include a metal plating film and a metal foil. The metal layer preferably consists of at least one kind of metal selected from a group consisting of nickel, copper, silver, and an alloy containing these kinds of metal as a main component. The "main component" refers to an element component having the highest weight ratio.

The conductor layer 12B includes, for example, a carbon layer provided on the surface of the solid electrolyte layer 12A and a copper layer provided on a surface of the carbon layer.

The carbon layer is provided to electrically and mechanically connect the solid electrolyte layer 12A and the copper layer to each other. The carbon layer can be formed in a predetermined region by applying a carbon paste to the surface of the solid electrolyte layer 12A by a method such as sponge transfer, screen printing, dispenser coating, or ink jet printing. It is preferable that the copper layer of the next step is laminated on the carbon layer in a viscous state before drying. A thickness of the carbon layer is preferably 2 μm to 20 μm.

The copper layer can be formed in a predetermined region by applying a copper paste to the surface of the carbon layer by a method such as sponge transfer, screen printing, spray coating, dispenser coating, or ink jet printing. A thickness of the copper layer is preferably 2 μm to 20 μm.

The first through-conductor 20A is formed, for example, as follows. First, the first through-hole 50A that penetrates the sealing layer 30 and the capacitor element 10 in the thickness direction is formed by performing a process such as a drilling process or a laser process. Then, the inner wall surface of the first through-hole 50A is metallized with a metal material containing low-resistance metal such as copper, gold, or silver to form the first through-conductor 20A. In a case of forming the first through-conductor 20A, for example, the inner wall surface of the first through-hole 50A is metallized by a treatment such as an electroless copper plating treatment or an electrolytic copper plating treatment, which makes the process easy. In addition, the method of forming the first through-conductor 20A may be a method of filling the first through-hole 50A with a metal material, a composite material of metal and a resin, or the like, in addition to the method of metallizing the inner wall surface of the first through-hole 50A.

The second through-conductor 20B is formed, for example, as follows. First, a through-hole that penetrates the capacitor element 10 in the thickness direction is formed by performing a process such as a drilling process or a laser process. Next, the through-hole is filled with an insulating material such as the sealing layer 30. The second through-hole 50B is formed by performing a process such as a drilling process or a laser process on a portion filled with the insulating material. In this case, a state in which the insulating material is present between an inner wall surface of the through-hole filled with the insulating material and the inner wall surface of the second through-hole 50B in the plane direction is obtained by making a diameter of the second through-hole 50B smaller than a diameter of the through-hole filled with the insulating material. Thereafter, the inner wall surface of the second through-hole 50B is metallized with a metal material containing low-resistance metal such as copper, gold, or silver to form the second through-conductor 20B. In a case of forming the second through-conductor 20B, for example, the inner wall surface of the second through-hole 50B is metallized by a treatment such as an electroless copper plating treatment or an electrolytic copper plating treatment, which makes the process easy. In addition, the method of forming the second through-conductor 20B may be a method of filling the second through-hole 50B with a metal material, a composite material of metal and a resin, or the like, in addition to the method of metallizing the inner wall surface of the second through-hole 50B.

In a case where the first resin filling portion 25A is provided in the inner side portion of the first through-conductor 20A, the first resin filling portion 25A may be a conductor or an insulator. A material constituting the first resin filling portion 25A may have a thermal expansion coefficient larger than, smaller than, or the same as that of a material constituting the first through-conductor 20A (for example, copper).

In a case where the second resin filling portion 25B is provided in the inner side portion of the second through-conductor 20B, the second resin filling portion 25B may be a conductor or an insulator. A material constituting the second resin filling portion 25B may have a thermal expansion coefficient larger than, smaller than, or the same as that of a material constituting the second through-conductor 20B (for example, copper).

The sealing layer 30 is formed of an insulating material. In this case, the sealing layer 30 is preferably formed of an insulating resin.

Examples of the insulating resin forming the sealing layer 30 include an epoxy resin and a phenol resin.

The sealing layer 30 preferably further includes a filler.

Examples of the filler included in the sealing layer 30 include an inorganic filler such as silica particles and alumina particles.

The sealing layer 30 may be composed of only one layer or may be composed of two or more layers. In a case where the sealing layer 30 is composed of two or more layers, materials constituting layers may be the same as or different from each other.

The sealing layer 30 is formed to seal the capacitor element 10 by, for example, a method of thermo-compressing an insulating resin sheet, a method of applying an insulating resin paste and then thermosetting the insulating resin paste, or the like.

A layer such as a stress relaxing layer or a moisture-proof film may be provided between the capacitor element 10 and the sealing layer 30.

The insulating layer 35 is formed of an insulating material. In this case, the insulating layer 35 is preferably formed of an insulating resin.

Examples of the insulating resin forming the insulating layer 35 include a polyphenyl sulfone resin, a polyether sulfone resin, a cyanate ester resin, a fluororesin (tetrafluoroethylene, a tetrafluoroethylene-perfluoroalkyl vinyl ether copolymer, and the like), a polyimide resin, a polyamide-imide resin, an epoxy resin, and derivatives or precursors thereof.

The insulating layer 35 may be formed of the same resin as the sealing layer 30. Unlike the sealing layer 30, in a case where the insulating layer 35 contains an inorganic filler, there is a concern that the inorganic filler may adversely affect an effective capacitance portion of the capacitor element 10. Therefore, it is preferable that the insulating layer 35 consists of a system of only a resin.

The insulating layer 35 can be formed in a predetermined region by applying a mask material such as a composition containing the insulating resin to the surface of the porous portion 11B by a method such as sponge transfer, screen printing, dispenser coating, or ink jet printing.

The insulating layer 35 may be formed on the porous portion 11B at a timing before the dielectric layer 13 is formed or at a timing after the dielectric layer 13 is formed.

Examples of a constituent material of the first conductor wiring layer 40A include a metal material containing low-resistance metal such as silver, gold, or copper. In this case, the first conductor wiring layer 40A is formed, for example, by performing a plating treatment on the surface of the first through-conductor 20A.

In order to improve adhesiveness between the first conductor wiring layer 40A and another member, here, adhesiveness between the first conductor wiring layer 40A and the first through-conductor 20A, a mixed material of at least one conductive filler selected from a group consisting of a silver filler, a copper filler, a nickel filler, and a carbon filler and a resin may be used as the constituent material of the first conductor wiring layer 40A.

Examples of a constituent material of the second conductor wiring layer 40B include a metal material containing low-resistance metal such as silver, gold, or copper. In this case, the second conductor wiring layer 40B is formed, for example, by performing a plating treatment on the surface of the second through-conductor 20B.

In order to improve adhesiveness between the second conductor wiring layer 40B and another member, here, adhesiveness between the second conductor wiring layer 40B and the second through-conductor 20B, a mixed material of at least one conductive filler selected from a group consisting of a silver filler, a copper filler, a nickel filler, and a carbon filler and a resin may be used as the constituent material of the second conductor wiring layer 40B.

It is preferable that the constituent materials of the first conductor wiring layer 40A and the second conductor wiring layer 40B are the same at least in terms of type, but they may be different from each other.

Examples of a constituent material of the via-conductor 45 include a metal material containing low-resistance metal such as silver, gold, or copper.

The via-conductor 45 is formed, for example, by performing a plating treatment on the inner wall surface with the above-described metal material with respect to a through-hole penetrating the sealing layer 30 in the thickness direction, or by filling the through-hole with a conductive paste and then performing a heat treatment.

The capacitor array according to the present disclosure is not limited to the above-described embodiment, and various applications and modifications can be added to the configuration, manufacturing conditions, and the like of the capacitor array within the scope of the present disclosure.

The capacitor array according to the present disclosure can be suitably used as a constituent material of a composite electronic component. Such a composite electronic component includes, for example, the capacitor array according to the present disclosure, an outer electrode (for example, a first conductor wiring layer and a second conductor wiring layer) that is provided in an outer side portion of the sealing layer of the capacitor array and is electrically connected to each of the first electrode layer and the second electrode layer of the capacitor element, and an electronic component connected to the outer electrode.

In the composite electronic component, the electronic component connected to the outer electrode may be a passive element or an active element. Both the passive element and the active element may be connected to the outer electrode, or any one of the passive element and the active element may be connected to the outer electrode. In addition, a composite body of the passive element and the active element may be connected to the outer electrode.

Examples of the passive element include an inductor. Examples of the active element include a memory, a graphical processing unit (GPU), a central processing unit (CPU), a micro processing unit (MPU), and a power management IC (PMIC).

The capacitor array according to the present disclosure has a sheet-like shape as a whole. Therefore, in the composite electronic component, the capacitor array can be treated as a mounting substrate, and the electronic component can be mounted on the capacitor array. Further, by forming a shape of the electronic component to be mounted on the capacitor array in a sheet-like shape, it is also possible to connect the capacitor array and the electronic component in the thickness direction via a through-hole conductor that penetrates each electronic component in the thickness direction. As a result, the active element and the passive element can be configured as a unified module.

For example, the capacitor array according to the present disclosure can be electrically connected between a voltage regulator including a semiconductor active element and a load, to which a converted direct current voltage is supplied, to form a switching regulator.

In the composite electronic component, a circuit layer may be formed on any one surface of a capacitor matrix sheet in which a plurality of the capacitor arrays according to the present disclosure are further laid out, and then may be connected to the passive element or the active element.

In addition, the capacitor array according to the present disclosure may be disposed in a cavity portion provided in advance on a substrate, the cavity portion may be filled with a resin, and then a circuit layer may be formed on the resin. Another electronic component (the passive element or the active element) may be mounted in another cavity portion of the same substrate.

Alternatively, the capacitor array according to the present disclosure may be mounted on a smooth carrier such as a wafer or glass, an outer layer portion may be formed of a resin, a circuit layer may be formed, and then the circuit layer may be connected to the passive element or the active element.

The present specification discloses the following contents.

<1> A capacitor array, including: a plurality of capacitor units arranged in a plane direction, in which each of the capacitor units includes a capacitor element, a first through-conductor, and a second through-conductor, the capacitor element includes a first electrode layer and a second electrode layer, and a dielectric layer, the first electrode layer and the second electrode layer face each other with the dielectric layer in between in a thickness direction perpendicular to the plane direction, the first through-conductor is on at least an inner wall surface of a first through-hole that penetrates the capacitor element in the thickness direction and is electrically connected to the first electrode layer, the second through-conductor is on at least an inner wall surface of a second through-hole that penetrates the capacitor element in the thickness direction and is electrically connected to the second electrode layer, an area of the capacitor unit, a diameter of the first through-hole, an area of the first through-conductor in the first through-hole, a diameter of the second through-hole, an area of the second through-conductor in the second through-hole, and an inter-center distance between the first through-conductor and the second through-conductor are equivalent between the capacitor units in a plan view of the capacitor array in the thickness direction, and when the area of the first through-conductor in the first through-hole is denoted by $S_{TH1}$ and the area of the second through-conductor in the second through-hole is denoted by $S_{TH2}$ in the capacitor unit, and a total number of the capacitor units included in the capacitor array is denoted by N, in a case where a correlation of an electrostatic capacity $C_{unit}$ per unit with respect to an inter-center distance p between the first through-conductor and the second through-conductor is obtained from virtual units satisfying all of Conditions 1 to 4: Condition 1: a total number of the virtual units included in the capacitor array is denoted by n, Condition 2: an area of a virtual unit, a diameter of a first through-hole, an area of a first through-conductor in the first through-hole, a diameter of a second through-hole, an area of a second through-conductor in the second through-hole, and an inter-center distance between the first through-conductor and the second through-conductor are equivalent between the virtual units in the plan view of the capacitor array in the thickness direction, Condition 3: the area of the first through-conductor in the first through-hole is denoted by $S_{th1}$ and the area of the second through-conductor in the second through-hole is denoted by $S_{th2}$ in the virtual unit, and Condition 4: a value of $(S_{th1}+S_{th2})\times n$ is equal to a value of $(S_{TH1}+S_{TH2})\times N$, an actual overall capacitance corresponding to an electrostatic capacity for a total area of the capacitor units in an electrostatic capacity of an entirety of the capacitor array is larger than a virtual overall capacitance obtained by multiplying the total number n of the virtual units corresponding to the inter-center distance p when the electrostatic capacity $C_{unit}$ per unit reaches a maximum value by the maximum value of the electrostatic capacity $C_{unit}$ per unit.

<2> The capacitor array according to <1>, in which the capacitor units include a first unit, and a second unit adjacent to the first unit, and an inter-center distance between a first through-conductor of the first unit and a second through-conductor of the first unit is equivalent to an inter-center distance between the first through-conductor of the first unit and a second through-conductor of the second unit in the plan view of the capacitor array in the thickness direction.

<3> The capacitor array according to <2>, in which the capacitor units further include a third unit adjacent to the first unit, and an inter-center distance between the second through-conductor of the first unit and the second through-conductor of the second unit is equivalent to an inter-center distance between the second through-conductor of the first unit and a second through-conductor of the third unit in the plan view of the capacitor array in the thickness direction.

<4> The capacitor array according to <3>, in which the second through-conductor of the third unit is present on a straight line obtained by rotating a line segment connecting a center of the second through-conductor of the first unit and a center of the second through-conductor of the second unit by an angle of 60 degrees, 90 degrees, 120 degrees, or 180 degrees with the center of the second through-conductor of the first unit as a reference in the plan view of the capacitor array in the thickness direction.

<5> The capacitor array according to <3> or <4>, in which the capacitor units further include a fourth unit adjacent to the first unit, and the inter-center distance between the second through-conductor of the second unit and the second through-conductor of the first unit is equivalent to an inter-center distance between the second through-conductor of the second unit and a second through-conductor of the fourth unit in the plan view of the capacitor array in the thickness direction.

<6> The capacitor array according to any one of <2> to <5>, in which the inter-center distance between the second through-conductor of the first unit and the first through-conductor of the first unit is equivalent to an inter-center distance between the second through-conductor of the first unit and a first through-conductor of the second unit in the plan view of the capacitor array in the thickness direction.

<7> The capacitor array according to <6>, in which the capacitor units further include a third unit adjacent to the first unit, and an inter-center distance between the first through-conductor of the first unit and the first through-conductor of the second unit is equivalent to an inter-center distance between the first through-conductor of the first unit and a first through-conductor of the third unit in the plan view of the capacitor array in the thickness direction.

<8> The capacitor array according to <7>, in which the first through-conductor of the third unit is present on a straight line obtained by rotating a line segment connecting a center of the first through-conductor of the first unit and a center of the first through-conductor of the second unit by an angle of 60 degrees, 90 degrees, 120 degrees, or 180 degrees with the center of the first through-conductor of the first unit as a reference in the plan view of the capacitor array in the thickness direction.

<9> The capacitor array according to <7> or <8>, in which the capacitor units further include a fourth unit adjacent to the first unit, and the inter-center distance between the first through-conductor of the second unit and the first through-conductor of the first unit is equivalent to an inter-center distance between the first through-conductor of the second unit and a first through-conductor of the fourth unit in the plan view of the capacitor array in the thickness direction.

<10> The capacitor array according to <1>, in which the capacitor units include a first unit, and a second unit adjacent to the first unit, and an inter-center distance between a second through-conductor of the first unit and a first through-conductor of the first unit is equivalent to an inter-center distance between the second through-conductor of the first unit and a first through-conductor of the second unit in the plan view of the capacitor array in the thickness direction.

<11> The capacitor array according to <10>, in which the capacitor units further include a third unit adjacent to the first unit, and an inter-center distance between the first through-conductor of the first unit and the first through-conductor of the second unit is equivalent to an inter-center distance between the first through-conductor of the first unit and a first through-conductor of the third unit in the plan view of the capacitor array in the thickness direction.

<12> The capacitor array according to <11>, in which the first through-conductor of the third unit is present on a straight line obtained by rotating a line segment connecting a center of the first through-conductor of the first unit and a center of the first through-conductor of the second unit by an angle of 60 degrees, 90 degrees, 120 degrees, or 180 degrees with the center of the first through-conductor of the first unit as a reference in the plan view of the capacitor array in the thickness direction.

<13> The capacitor array according to <11> or <12>, in which the capacitor units further include a fourth unit adjacent to the first unit, and the inter-center distance between the first through-conductor of the second unit and the first through-conductor of the first unit is equivalent to an inter-center distance between the first through-conductor of the second unit and a first through-conductor of the fourth unit in the plan view of the capacitor array in the thickness direction.

<14> The capacitor array according to any one of <1> to <13>, in which, when an inter-center distance between the first through-conductor and the second through-conductor is denoted by P, the area of the capacitor unit is represented by $2P\times\sqrt{3}/2\times P$ in the plan view of the capacitor array in the thickness direction.

<15> The capacitor array according to any one of <1> to <13>, in which, when an inter-center distance between the first through-conductor and the second through-conductor is denoted by P, the area of the capacitor unit is represented by $2P\times P$ in the plan view of the capacitor array in the thickness direction.

<16> The capacitor array according to any one of <1> to <15>, in which the diameter of the first through-hole is equivalent to the diameter of the second through-hole in one of the capacitor units.

<17> The capacitor array according to any one of <1> to <16>, in which the area of the first through-conductor in the first through-hole is equivalent to the area of the second through-conductor in the second through-hole in one of the capacitor units.

<18> The capacitor array according to any one of <1> to <17>, in which the first electrode layer is a positive electrode plate including a core portion comprising a metal, and a porous portion on at least one main surface of the core portion, the dielectric layer is on a surface of the porous portion, and the second electrode layer is a negative electrode layer on a surface of the dielectric layer.

<19> The capacitor array according to <18>, in which the first through-conductor is electrically connected to the positive electrode plate at the inner wall surface of the first through-hole.

<20> The capacitor array according to <18> or <19>, in which the negative electrode layer includes a solid electrolyte layer provided on the surface of the dielectric layer.

REFERENCE SIGNS LIST

1, 1A, 1B capacitor array
1U capacitor unit
1UA first unit
1UB second unit
1UC third unit
1UD fourth unit
10 capacitor element
11 positive electrode plate (first electrode layer)

11A core portion
11B porous portion
12 negative electrode layer (second electrode layer)
12A solid electrolyte layer
12B conductor layer
13 dielectric layer
20A first through-conductor
20B second through-conductor
25A first resin filling portion
25B second resin filling portion
30 sealing layer
35 insulating layer
40A first conductor wiring layer
40B second conductor wiring layer
45 via-conductor
50A first through-hole
50B second through-hole
$D_{TH1}$ diameter of first through-hole
$D_{TH2}$ diameter of second through-hole
P inter-center distance between first through-conductor and second through-conductor

The invention claimed is:

1. A capacitor array, comprising a plurality of capacitor units arranged in a plane direction, wherein each of the capacitor units includes a capacitor element, a first through-conductor, and a second through-conductor, the capacitor element includes a first electrode layer and a second electrode layer, and a dielectric layer, the first electrode layer and the second electrode layer face each other with the dielectric layer in between in a thickness direction perpendicular to the plane direction, the first through-conductor is on at least an inner wall surface of a first through-hole that penetrates the capacitor element in the thickness direction and is electrically connected to the first electrode layer, the second through-conductor is on at least an inner wall surface of a second through-hole that penetrates the capacitor element in the thickness direction and is electrically connected to the second electrode layer, an area of the capacitor unit, a diameter of the first through-hole, an area of the first through-conductor in the first through-hole, a diameter of the second through-hole, an area of the second through-conductor in the second through-hole, and an inter-center distance between the first through-conductor and the second through-conductor are equivalent between the capacitor units in a plan view of the capacitor array in the thickness direction, and when the area of the first through-conductor in the first through-hole is denoted by $S_{TH1}$ and the area of the second through-conductor in the second through-hole is denoted by $S_{TH2}$ in the capacitor unit, and a total number of the capacitor units included in the capacitor array is denoted by N, in a case where a correlation of an electrostatic capacity $C_{unit}$ per unit with respect to an inter-center distance p between the first through-conductor and the second through-conductor is obtained from virtual units satisfying all of Conditions 1 to 4:

Condition 1: a total number of the virtual units included in the capacitor array is denoted by n, Condition 2: an area of a virtual unit, a diameter of a first through-hole, an area of a first through-conductor in the first through-hole, a diameter of a second through-hole, an area of a second through-conductor in the second through-hole, and an inter-center distance between the first through-conductor and the second through-conductor are equivalent between the virtual units in the plan view of the capacitor array in the thickness direction, Condition 3: the area of the first through-conductor in the first through-hole is denoted by $S_{th1}$ and the area of the second through-conductor in the second through-hole is denoted by $S_{th2}$ in the virtual unit, and Condition 4: a value of $(S_{th1}+S_{th2})\times n$ is equal to a value of $(S_{TH1}+S_{TH2})\times N$, and an actual overall capacitance corresponding to an electrostatic capacity for a total area of the capacitor units in an electrostatic capacity of an entirety of the capacitor array is larger than a virtual overall capacitance obtained by multiplying the total number n of the virtual units corresponding to the inter-center distance p when the electrostatic capacity $C_{unit}$ per unit reaches a maximum value by the maximum value of the electrostatic capacity $C_{unit}$ per unit.

2. The capacitor array according to claim 1, wherein the capacitor units include a first unit, and a second unit adjacent to the first unit, and an inter-center distance between a first through-conductor of the first unit and a second through-conductor of the first unit is equivalent to an inter-center distance between the first through-conductor of the first unit and a second through-conductor of the second unit in the plan view of the capacitor array in the thickness direction.

3. The capacitor array according to claim 2, wherein the capacitor units further include a third unit adjacent to the first unit, and an inter-center distance between the second through-conductor of the first unit and the second through-conductor of the second unit is equivalent to an inter-center distance between the second through-conductor of the first unit and a second through-conductor of the third unit in the plan view of the capacitor array in the thickness direction.

4. The capacitor array according to claim 3, wherein the second through-conductor of the third unit is present on a straight line obtained by rotating a line segment connecting a center of the second through-conductor of the first unit and a center of the second through-conductor of the second unit by an angle of 60 degrees, 90 degrees, 120 degrees, or 180 degrees with the center of the second through-conductor of the first unit as a reference in the plan view of the capacitor array in the thickness direction.

5. The capacitor array according to claim 3, wherein the capacitor units further include a fourth unit adjacent to the first unit, and the inter-center distance between the second through-conductor of the second unit and the second through-conductor of the first unit is equivalent to an inter-center distance between the second through-conductor of the second unit and a second through-conductor of the fourth unit in the plan view of the capacitor array in the thickness direction.

6. The capacitor array according to claim 2, wherein the inter-center distance between the second through-conductor of the first unit and the first through-conductor of the first unit is equivalent to an inter-center distance between the second through-conductor of the first unit and a first through-conductor of the second unit in the plan view of the capacitor array in the thickness direction.

7. The capacitor array according to claim 6, wherein the capacitor units further include a third unit adjacent to the first unit, and an inter-center distance between the first through-conductor of the first unit and the first through-conductor of the second unit is equivalent to an inter-center distance between the first through-conductor of the first unit and a first through-conductor of the third unit in the plan view of the capacitor array in the thickness direction.

8. The capacitor array according to claim 7, wherein the first through-conductor of the third unit is present on a straight line obtained by rotating a line segment connecting a center of the first through-conductor of the first unit and a center of the first through-conductor of the second unit by an angle of 60 degrees, 90 degrees, 120 degrees, or 180 degrees with the center of the first through-conductor of the first unit as a reference in the plan view of the capacitor array in the thickness direction.

9. The capacitor array according to claim 7, wherein the capacitor units further include a fourth unit adjacent to the first unit, and the inter-center distance between the first through-conductor of the second unit and the first through-conductor of the first unit is equivalent to an inter-center distance between the first through-conductor of the second unit and a first through-conductor of the fourth unit in the plan view of the capacitor array in the thickness direction.

10. The capacitor array according to claim 1, wherein the capacitor units include a first unit, and a second unit adjacent to the first unit, and an inter-center distance between a second through-conductor of the first unit and a first through-conductor of the first unit is equivalent to an inter-center distance between the second through-conductor of the first unit and a first through-conductor of the second unit in the plan view of the capacitor array in the thickness direction.

11. The capacitor array according to claim 10, wherein the capacitor units further include a third unit adjacent to the first unit, and an inter-center distance between the first through-conductor of the first unit and the first through-conductor of the second unit is equivalent to an inter-center distance between the first through-conductor of the first unit and a first through-conductor of the third unit in the plan view of the capacitor array in the thickness direction.

12. The capacitor array according to claim 11, wherein the first through-conductor of the third unit is present on a straight line obtained by rotating a line segment connecting a center of the first through-conductor of the first unit and a center of the first through-conductor of the second unit by an angle of 60 degrees, 90 degrees, 120 degrees, or 180 degrees with the center of the first through-conductor of the first unit as a reference in the plan view of the capacitor array in the thickness direction.

13. The capacitor array according to claim 11, wherein the capacitor units further include a fourth unit adjacent to the first unit, and the inter-center distance between the first through-conductor of the second unit and the first through-conductor of the first unit is equivalent to an inter-center distance between the first through-conductor of the second unit and a first through-conductor of the fourth unit in the plan view of the capacitor array in the thickness direction.

14. The capacitor array according to claim 1, wherein, when an inter-center distance between the first through-conductor and the second through-conductor is denoted by P, the area of the capacitor unit is represented by $2P \times \sqrt{3}/2 \times P$ in the plan view of the capacitor array in the thickness direction.

15. The capacitor array according to claim 1, wherein, when an inter-center distance between the first through-conductor and the second through-conductor is denoted by P, the area of the capacitor unit is represented by $2P \times P$ in the plan view of the capacitor array in the thickness direction.

16. The capacitor array according to claim 1, wherein the diameter of the first through-hole is equivalent to the diameter of the second through-hole in one of the capacitor units.

17. The capacitor array according to claim 1, wherein the area of the first through-conductor in the first through-hole is equivalent to the area of the second through-conductor in the second through-hole in one of the capacitor units.

18. The capacitor array according to claim 1, wherein the first electrode layer is a positive electrode plate including a core portion comprising a metal, and a porous portion on at least one main surface of the core portion, the dielectric layer is on a surface of the porous portion, and the second electrode layer is a negative electrode layer on a surface of the dielectric layer.

19. The capacitor array according to claim 18, wherein the first through-conductor is electrically connected to the positive electrode plate at the inner wall surface of the first through-hole.

20. The capacitor array according to claim 18, wherein the negative electrode layer includes a solid electrolyte layer on the surface of the dielectric layer.

* * * * *